US005745159A

United States Patent [19]

Wax et al.

[11] Patent Number: 5,745,159

[45] Date of Patent: Apr. 28, 1998

[54] PASSENGER AIRCRAFT ENTERTAINMENT DISTRIBUTION SYSTEM HAVING IN-LINE SIGNAL CONDITIONING

[75] Inventors: David W. Wax, Seattle; John Haworth, Lynnwood, both of Wash.

[73] Assignee: The Boeing Company, Seattle, Wash.

[21] Appl. No.: 438,980

[22] Filed: May 11, 1995

[51] Int. Cl.[6] .......... H04N 7/10

[52] U.S. Cl. .......... 348/8; 348/6; 455/3.1; 455/6.1; 455/14

[58] Field of Search .......... 348/6, 8, 10; 455/3.1, 455/6.3, 11.1, 14, 6.1

[56] References Cited

U.S. PATENT DOCUMENTS

| | | | |
|---|---|---|---|
| 4,061,970 | 12/1977 | Magneron | 325/2 |
| 5,214,502 | 5/1993 | Rabowsky et al. | 358/86 |
| 5,317,392 | 5/1994 | Ishibashi et al. | 348/6 |
| 5,546,050 | 8/1996 | Florian et al. | 330/282 |

*Primary Examiner*—John K. Peng
*Assistant Examiner*—Linus H. Lo
*Attorney, Agent, or Firm*—Christensen, O'Connor, Johnson & Kindness PLLC

[57] ABSTRACT

A distribution system for a passenger entertainment system (30) that provides appropriate in-line amplification and equalization of an entertainment signal carried on a common bus (40). The distribution system is comprised of a network of zone management units (ZMUs) (**42*a*, 42*b*, . . . 42*n*) and seat electronics units (SEUs) (48*a*, 48*b*, . . . 48*n*) connected to the bus. Each ZMU contains a variable gain amplifier in series with the bus to amplify the entertainment signal carried on the bus. Each ZMU also contains a variable slope compensation network (84) that is continuously adjusted to equalize the amplitude of the entertainment signal across the signal bandwidth. Each SEU contains a variable gain amplifier in series with the bus to amplify the entertainment signal carried on the bus. Each SEU also contains a fixed slope compensation network (330**) that may be switched in series with the bus to equalize the amplitude of the entertainment signal across the signal bandwidth. Initialization routines are disclosed to initially configure the ZMUs and SEUs in the distribution system prior to system operation.

20 Claims, 14 Drawing Sheets

PASSENGER AIRCRAFT ENTERTAINMENT DISTRIBUTION SYSTEM HAVING IN-LINE SIGNAL CONDITIONING

FIELD OF THE INVENTION

The present invention relates generally to passenger aircraft entertainment systems, and more particularly to a system for distributing an entertainment signal to seats in a passenger aircraft.

BACKGROUND OF THE INVENTION

During long flights, entertainment options for passengers traveling on aircraft have typically been severely limited. Although airlines have attempted to improve their service by offering in-flight movies, the passenger is given little ability to select the content of the video programming that they receive. To improve the quality of the service to the passengers, many aircraft manufacturers have therefore desired to incorporate an advanced passenger entertainment system into the aircraft cabin. In such an entertainment system, it is envisioned that each passenger seat would be provided with an individually controllable audio receiver and video display. The audio receiver would allow a passenger to listen to and select among several different channels of music programming. The video display would allow a passenger to play video games or select among a number of different movies or shows. By allowing the passenger to select the content of the programming that they receive, passengers would be able to entertain themselves during long flights.

Incorporating an individualized passenger entertainment system in an aircraft is a challenging engineering problem. Multiple channels of audio and video signals must be transmitted to each of the passenger seats from a central control location. Since most commercial passenger aircraft have several hundred seats, a large coaxial bus network must be provided within each aircraft to allow signal distribution. As the audio and video signals are split and distributed over the network, the power level of the signal has a tendency to drop the further the signal gets from the central control station. In addition to an overall drop in signal strength, the inherent resistance of a coaxial bus also dissipates the power of the entertainment signal unequally. Cable losses at higher frequencies are considerably greater than cable losses at lower frequencies. A plot of the entertainment signal attenuation versus the frequency of the signal will therefore exhibit an approximately linear slope, with the higher frequencies being more attenuated than the lower frequencies. In order to ensure an adequate signal at each passenger seat, a passenger entertainment system must therefore correct for both the change in overall signal amplitude as well as the unequal attenuation across the bandwidth of the signal. An entertainment system that cannot amplify and condition the entertainment signal during distribution to passengers will result in varying quality reception at each seat.

Further compounding the problem of designing an adequate distribution network is the variability in aircraft layout. Because most aircraft manufacturers sell many different styles of a single aircraft with a variety of seating arrangements, it is not possible to design a standard network for inclusion in all the aircraft. Seats are typically added to and removed from an aircraft during the aircraft's lifetime, changing the seating configuration within a given aircraft. As the number and location of seats change, the cable lengths in the network change and the total load on the network changes. Each change has an effect upon the signal quality of the entertainment system. A passenger entertainment system must therefore include a distribution network that is capable of dynamically compensating to account for the changing conditions that occur as the seating arrangement of the aircraft changes.

An example of an individualized passenger entertainment system is described in U.S. Pat. No. 5,220,419 entitled "Automatic RF Leveling In Passenger Aircraft Video Distribution System" and U.S. Pat. No. 5,214,505 entitled "Automatic RF Equalization in Passenger Aircraft Video Distribution System." The system includes a number of stations (18, 28) which tap and split an audio/video signal that is carried on a cable (16, 26). Several of the stations include a variable gain amplifier and a variable gain equalizer that is controlled by a microprocessor. The microprocessor monitors the signal level on the cable, and adjusts the gain and/or equalization to set the audio/video signal to a desired level. The system disclosed in U.S. Pat. Nos. 5,220,419 and 5,214,505 also allows the microprocessor to communicate among the various stations. If one station is unable to provide sufficient amplification or equalization to the audio/video signal due to the operating limits of the variable gain amplifier or equalizer, a station located closer to the signal source may increase the amplification or equalization that it provides. Several stations can therefore be networked together to ensure that the signal power level and conditioning is sufficient throughout the system.

A passenger entertainment system distribution network that taps or splits a signal from a bus before amplifying and conditioning the signal, such as suggested in U.S. Pat. No. 5,220,419, has several shortcomings. Most importantly, splitting a signal at each station in a chain of stations progressively reduces the power level in the signal. Because a minimum signal strength must be available at the last station in the chain, the initial signal amplitude must therefore be very large. Several problems arise when generating a high power signal and distributing the signal over a network. Generating a high powered signal tends to increase the consumption of the plane's power. Because all electrical systems on an aircraft must operate from an on-board power supply, it is desirable to minimize the power consumption of any system on the aircraft. More problematic, however, is that the high power signal may potentially radiate from the network and couple onto other signal lines that are present in an aircraft. Due to increasing concerns about stray signals potentially interfering with aircraft operation, especially during takeoff and landing, low power signal levels in a passenger entertainment system would be preferred because it would minimize the potential for interference.

An additional disadvantage of tapping and splitting a signal before amplifying or conditioning the signal is that it limits the number of stations that may be chained together. Absent isolation between each station, signal reflections will be generated on the bus as the signal is tapped and split. Because the stations are typically spaced at regular intervals in an aircraft passenger entertainment distribution system, the reflections will cause amplitude ripples on the bus that are pronounced at certain frequencies. The greater the number of stations on the bus, the greater the amplitude ripple. The lack of isolation or compensation for the ripple therefore limits the maximum number of stations that may be connected to the bus. Additionally, as noted above, each splitting of the signal reduces the overall signal level. Eventually the signal level drops to a point where system noise causes sufficient interference with the signal to severely impact the quality of the audio and video reception. Since the number of stations that may generally be chained together is therefore limited, the overall cabling required in a large system will increase.

The present invention is directed to a passenger aircraft entertainment system that overcomes or minimizes the above-mentioned problems.

SUMMARY OF THE INVENTION

In accordance with this invention, a passenger entertainment distribution system having in-line amplification and equalization of an entertainment signal carried on a common bus is disclosed. The entertainment signal is generated by an entertainment multiplexer controller, which multiplexes signals from multiple audio and video sources to produce a signal having both audio and video channels. The distribution system is comprised of a network of zone management units (ZMUs) and seat electronics units (SEUs) that are interconnected by a common bus. The ZMUs are connected in a daisy chain on the common bus to the entertainment multiplexer controller. Each ZMU contains a variable gain amplifier and a frequency slope compensation network connected in series with the bus. Two pilot tones are provided in the entertainment signal, a low frequency pilot tone and a high frequency pilot tone. By monitoring the amplitude of the high frequency pilot tone, the ZMU adjusts the gain provided by the variable gain amplifier to ensure that the entertainment signal is of sufficient strength for distribution. By monitoring the amplitude of both the high frequency and the low frequency pilot tones, the ZMU controls the attenuation provided by the frequency compensation network. The frequency compensation network may be adjusted to pass or to block low frequencies, thus adjusting the slope of the gain provided by the ZMU across the bandwidth of the entertainment signal. The ZMU therefore maintains the proper entertainment signal strength by appropriately adjusting the amplification and conditioning provided to the signal. After amplifying and conditioning the entertainment signal, each ZMU splits the entertainment signal for distribution to several serial daisy chains of SEUs.

Each SEU contains a variable gain amplifier connected in series with the bus. The SEU measures the amplitude of the low frequency pilot tone carried in the entertainment signal and automatically adjusts the gain of the variable gain amplifier to maintain the entertainment signal at a desired amplitude. Additionally, each SEU contains a frequency slope compensation network that may be switched into serial connection with the bus. The SEU monitors the amplitude of the high frequency pilot tone within the entertainment signal, and switches the frequency slope compensation network into the bus if signal conditioning is required. After appropriate amplification and conditioning of the entertainment signal, the signal is split for distribution to individual audio and video receivers contained at each passenger seat.

In accordance with one aspect of the invention, an initialization procedure is disclosed for the ZMU. By examining the amplitude of the high frequency pilot tone, the ZMU compares the amplitude of the entertainment signal with a target signal amplitude. The gain of the variable gain amplifier is then incrementally adjusted until the amplitude of the entertainment signal is equal to the target signal amplitude. After setting the amplitude of the entertainment signal, the ZMU compares the amplitude of the low frequency pilot tone with a target signal amplitude. If the amplitude of the low frequency pilot tone is not equivalent to the target signal level, the frequency slope compensation network is adjusted. In a preferred embodiment of the invention, the slope compensation network contains variable resistance p-i-n diodes. The amount of frequency attenuation provided by the slope compensation network can therefore be adjusted by varying the resistance of the p-i-n diodes. After the ZMU has initialized both the amplitude and the frequency equalization of the entertainment signal, the ZMU manages the SEU initialization procedure.

In accordance with another aspect of the invention, an initialization procedure for the SEUs is disclosed. The daisy chain of SEUs are initialized sequentially, starting with the unit closest to the ZMU and proceeding to the last unit in the daisy chain. Each SEU contains an Application Specific Integrated Circuit (ASIC) that has been designed to automatically maintain the amplitude of the entertainment signal carried on the RF bus. A control circuit is also provided in each SEU to monitor the amplitude of the high frequency pilot tone contained in the entertainment signal. If the amplitude of the high frequency pilot tone indicates that slope compensation is required, a frequency slope compensation network is switched into serial connection with the bus. During the initialization procedure, each SEU therefore determines whether the frequency slope compensation network must be connected to the bus to correctly condition the entertainment signal.

The initialization procedure for the ZMU and the SEU allow the distribution system disclosed herein to dynamically compensate for changes in the seating configuration of aircraft in which it is installed. The initialization procedure also allows the distribution system to be installed in a variety of aircraft layouts without having to redesign the network configuration.

It is a further aspect of the invention to disclose an operating mode of the passenger aircraft entertainment distribution system disclosed herein. After initialization, the distribution system continues to adjust the level of amplification and conditioning provided to the entertainment signal carried on the bus. Each ZMU continuously and automatically adjusts both the gain and the frequency slope compensation that is provided to the entertainment signal. Each SEU continuously and automatically adjusts the gain that is provided to the entertainment signal. The distribution system disclosed herein therefore dynamically compensates for changes in temperature or other environmental conditions which would have an effect on the quality of the entertainment signal received at each passenger seat.

In accordance with still another aspect of the invention, a novel method of identifying and dealing with fault conditions in the SEU daisy chain is disclosed. Each SEU contains circuitry to determine when the entertainment signal has dropped below a level necessary to provide adequate reception for the audio and video receivers connected to that SEU. When an inadequate signal is detected, each SEU has the capability to switch itself out of the bus carrying the entertainment signal. A failure of an SEU therefore does not have an effect upon the reception by the remainder of the SEUs in the distribution system. Additionally, the failure of an SEU may be easily detected by noting which video or audio unit is nonoperative.

Several advantages arise from the passenger entertainment distribution system of the present invention having in-line signal amplification and conditioning. Most importantly, the use of in-line amplifiers limits transmission reflections on the daisy chain of SEUs, keeping amplitude ripple on the bus to a minimum. The isolation provided by each in-line amplifier therefore allows a greater number of SEUs to be connected to the daisy chain. Additionally, the disclosed distribution system operates with a very low power entertainment signal. Amplification of the signal is provided at each ZMU and SEU before the entertainment signal is tapped or split for delivery to the passenger seats. Since the splitting occurs between amplifiers connected to the common bus, the overall level of the signal does not significantly drop from the first SEU in the daisy chain to the last SEU in the daisy chain. Moreover, because a low power signal is used within the entertainment distribution signal, there is little chance of interference with other aircraft electrical systems. The use of a low power signal also reduces the overall power requirements of the system. The passenger entertainment distribution system disclosed herein therefore represents an improvement over systems that tap or split a signal from a bus before amplifying and conditioning the signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
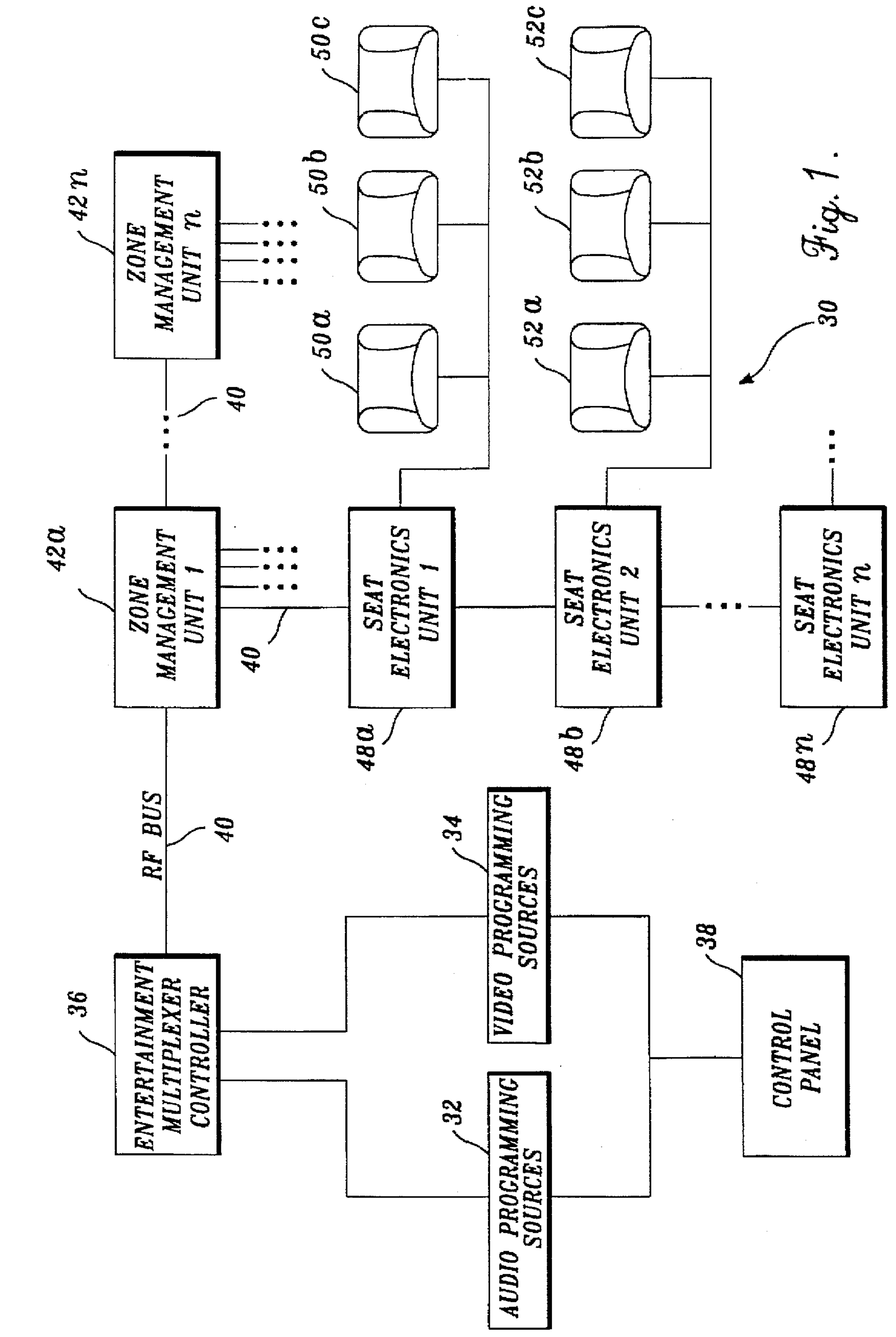
FIG. 1 is a block diagram of a passenger entertainment distribution system formed in accordance with the present invention.

FIG. 1 is a block diagram of a passenger entertainment system 30 suitable for installation in a commercial aircraft and including a distribution system in accordance with the present invention. The passenger entertainment system provides modulated radio frequency carrier signals from audio programming sources 32 and video programming sources 34 to each passenger in their individual seats. Representative audio programming may include material from compact disks, cassette tapes, or commercial broadcasts, and video programming may include material from video disks, video tapes, or commercial broadcasts. An entertainment multiplexer controller (EMC) 36 is used to sum the modulated radio frequency carrier signals from each audio or video programming source onto a bus. In a preferred embodiment of the invention, the modulated carrier signals have frequencies that fall within a radio frequency band that extends from 90 MHz to 360 MHz. Those skilled in the art will recognize that the number of channels of audio or visual programming that can be carried on a passenger entertainment signal is limited by the bandwidth of each channel.

Entertainment multiplexer controller 36 also generates two sinusoidal pilot tones that are used by the passenger entertainment distribution system to monitor and maintain the amplitude of the audio and video programming signals. In a preferred embodiment, the pilot tones are generated at approximately 90 MHz and 360 MHz. As will be discussed in greater detail below, the 90 MHz pilot tone is used to monitor and correct the overall amplitude of the audio and video programming signals. The 360 MHz pilot tone is used to monitor and correct for any nonlinearity in the attenuation across the multiple programming channels. While 90 MHz and 360 MHz pilot tones were selected for the preferred embodiment of the system, those skilled in the art will recognize that other pilot tone frequencies within the operative bandwidth of the system can be selected.

The radio frequency carriers modulated with video and audio programming signals are combined by the entertainment multiplexer controller onto a single radio frequency (RF) bus 40. Throughout this description, a signal having one or more pilot tones and one or more carrier signals modulated by audio or video programming signals will be referred to as an "entertainment signal." Each carrier signal modulated by audio or video programming will be referred to as a "channel." The entertainment signal therefore carries a number of channels. A control panel 38 is provided to manipulate the content of the entertainment signal provided by the passenger entertainment system on the RF bus.

The entertainment signal is distributed to passengers on the aircraft by a network of zone management units (ZMUs) **42*a*, 42*b*, . . . 42*n*, and seat electronics units (SEUs) 48*a*, 48*b*, . . . 48*n* that are connected to the RF bus. Each of the ZMUs taps the entertainment signal on the RF bus 40 and distributes the signal to a serial daisy chain of SEUs. Branching from each of the SEUs is a bus that provides the entertainment signal to three passenger seats. For example, SEU 48*a* provides the signal to passenger seats 50*a*, 50*b*, and 50*c* and SEU 48*b* provides the signal to seats 52*a*, 52*b*, and 52*c***. The passenger seats contain receivers for demodulating the video or audio programming signal from the carrier signal and to select between the multiple channels of audio and video programming. A passenger may then view the video programming on a television monitor, or listen to the audio programming using headphones.

Figure 2:
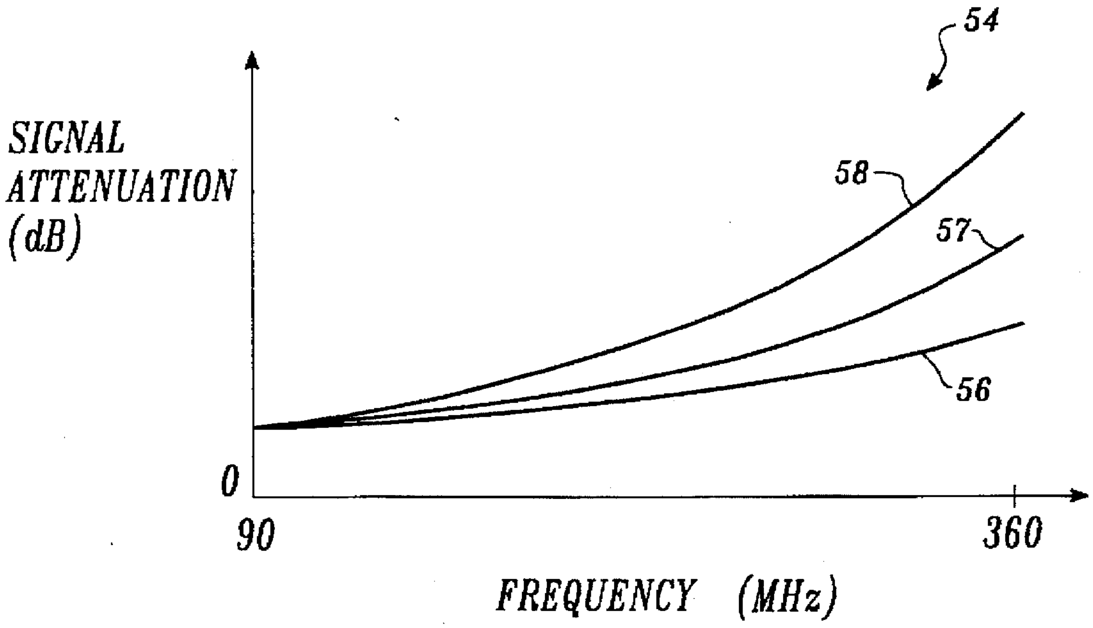
FIG. 2 is a representative graph of the attenuation of a signal transmitted over a coaxial bus.

As the entertainment signal is transmitted through the passenger entertainment system on RE bus 40, the signal is attenuated. The RF attenuation is caused by the dielectric loss and resistance of the bus cabling, as well as the splitting of the signal by the ZMUs and the SEUs. It will be appreciated that the amount of attenuation will typically vary over the frequency range of the transmitted entertainment signal, with the high frequencies of the signal being attenuated moire than the low frequencies of the signal. FIG. 2 is a representative graph 54 of the attenuation of the entertainment signal caused by transmission over a coaxial bus. The horizontal axis of the graph 54 spans the bandwidth of the entertainment signal, in a preferred embodiment from 90 MHz to 360 MHz. The vertical axis of the graph 54 represents the signal attenuation, with increasing attenuation the farther away from the origin. As shown by the graph, the attenuation of the entertainment signal is unequal over the bandwidth of the signal. Three curves are presented on the graph, each curve corresponding to a different length of cabling. Curve 56 represents the shortest length of cable, and curve 57 and curve 58 represent progressively longer lengths of cable. As the cable length increases, the high frequency attenuation of the entertainment signal increases. At lower frequencies, the attenuation in the signals is approximately the same regardless of cable length. Generally, however, for a given cable length the attenuation between the entertainment signal bandwidth from 90 MHz to 360 MHz may be modeled as a line having a particular slope.

Since the preferred entertainment signal has a bandwidth from 90 MHz to 360 MHz, channels closer to 360 MHz will be more attenuated than channels closer to 90 MHz. Unless appropriately compensated for, the overall loss in signal amplitude during distribution leads to poor quality video or audio reproduction at the passenger seat. A passenger entertainment distribution system must therefore dynamically compensate for the unequal attenuation of the signal carried on the distribution bus if distortion free audio and video programming is to be provided to all the passengers.

I. Distribution System Initialization

In order to compensate for the unequal attenuation of a network, the distribution system in the passenger entertainment system 30 of the present invention initializes itself upon start-up to determine the appropriate signal conditioning and amplification to provide throughout the network. Initialization is appropriate whenever a change has been made in the distribution network, such as the addition of ZMUs, SEUs, or a change in cable lengths. FIGURE, 3 is a flow chart of a main initialization procedure 60 for initializing the passenger entertainment distribution system. Initialization involves determining the appropriate level of amplification or conditioning to be performed by the ZMUs and SEUs on the entertainment signal for the given network. Following initialization, the passenger entertainment distribution system enters an operating mode. During the operating mode, the amplification continues to be adjusted but a minimal level of additional signal conditioning is performed. As each block in the main initialization procedure is discussed below, the hardware design for the particular distribution system component being initialized will be described and the initialization routine will be discussed in detail.

1. EMC Initialization

When the passenger entertainment system is initially powered up after any change in the distribution network, at a block 62 the first step in the initialization of the passenger entertainment distribution system is to allow a period of time for the entertainment multiplexer controller (EMC) 36 to initialize. For proper distribution system operation, the entertainment signal provided by the EMC must meet the following requirements. First, the channels carried on the entertainment signal must be normalized. That is, the amplitude and dynamic range of the individual audio and video channels must be approximately the same so that the signal quality is consistent across the bandwidth of the entertainment signal. Second, the entertainment multiplexer controller must add pilot tones to the signal. In a preferred embodiment of the invention, the pilot tones are added at approximately 90 MHz and 360 MHz. The pilot tones must be highly accurate, both in frequency and in amplitude, because the distribution system uses the pilot tones to determine the amplification and conditioning to be performed on the entertainment signal. The EMC must therefore contain specialized circuitry, and preferably redundant circuitry, to ensure that the 90 MHz and 360 MHz pilot tones are accurately generated and maintained.

With reference to FIG. 1, once the entertainment signal has been constructed by the EMC, it is transmitted to the zone management units 42*a*, 42*b*, . . . 42*n* over the coaxial bus 40. The bus 40 may vary in length, depending upon the location of the EMC within the aircraft and the configuration of the aircraft. As discussed above, depending on the length of the bus, the entertainment signal will be attenuated by a variable amount before reaching the first ZMU 42*a*. Each ZMU must therefore be initialized to determine the appropriate amplification and conditioning to provide the entertainment signal received from the EMC.

2. ZMU Hardware and Initialization

Figure 3:
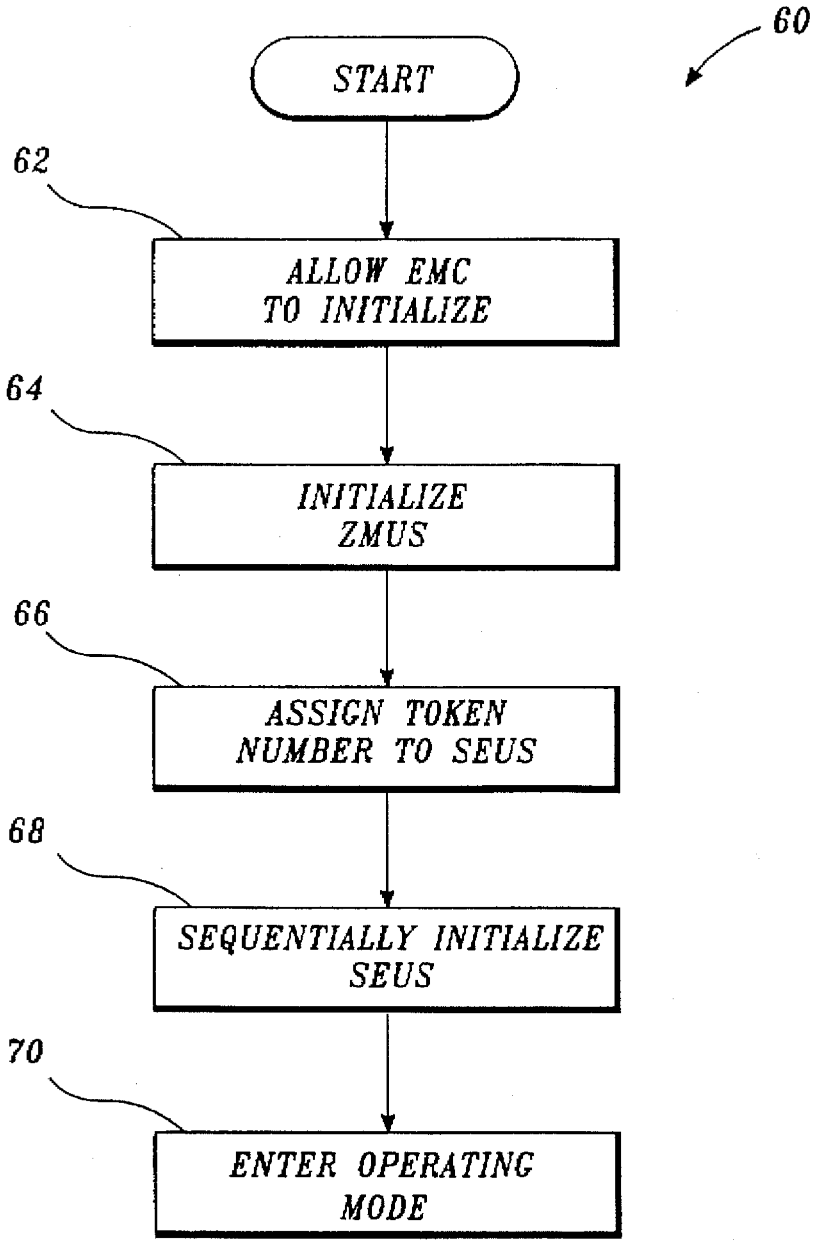
FIG. 3 is a flow chart of an initialization procedure to configure the passenger entertainment distribution system of FIG. 1 for appropriate amplification and conditioning of an entertainment signal carried on a bus.

Returning to the main initialization procedure 60 in FIG. 3, at a block 64 the zone management units (ZMUs) 42*a*, 42*b*, . . . 42*n* in the passenger entertainment distribution system are initialized. Each ZMU in the daisy chain is initialized sequentially, starting with the ZMU 42*a* closest to the EMC and proceeding to the last ZMU 42*n*. The initialization of each ZMU can be better understood with reference to FIGS. 4 and 5A–5F.

Figure 4:
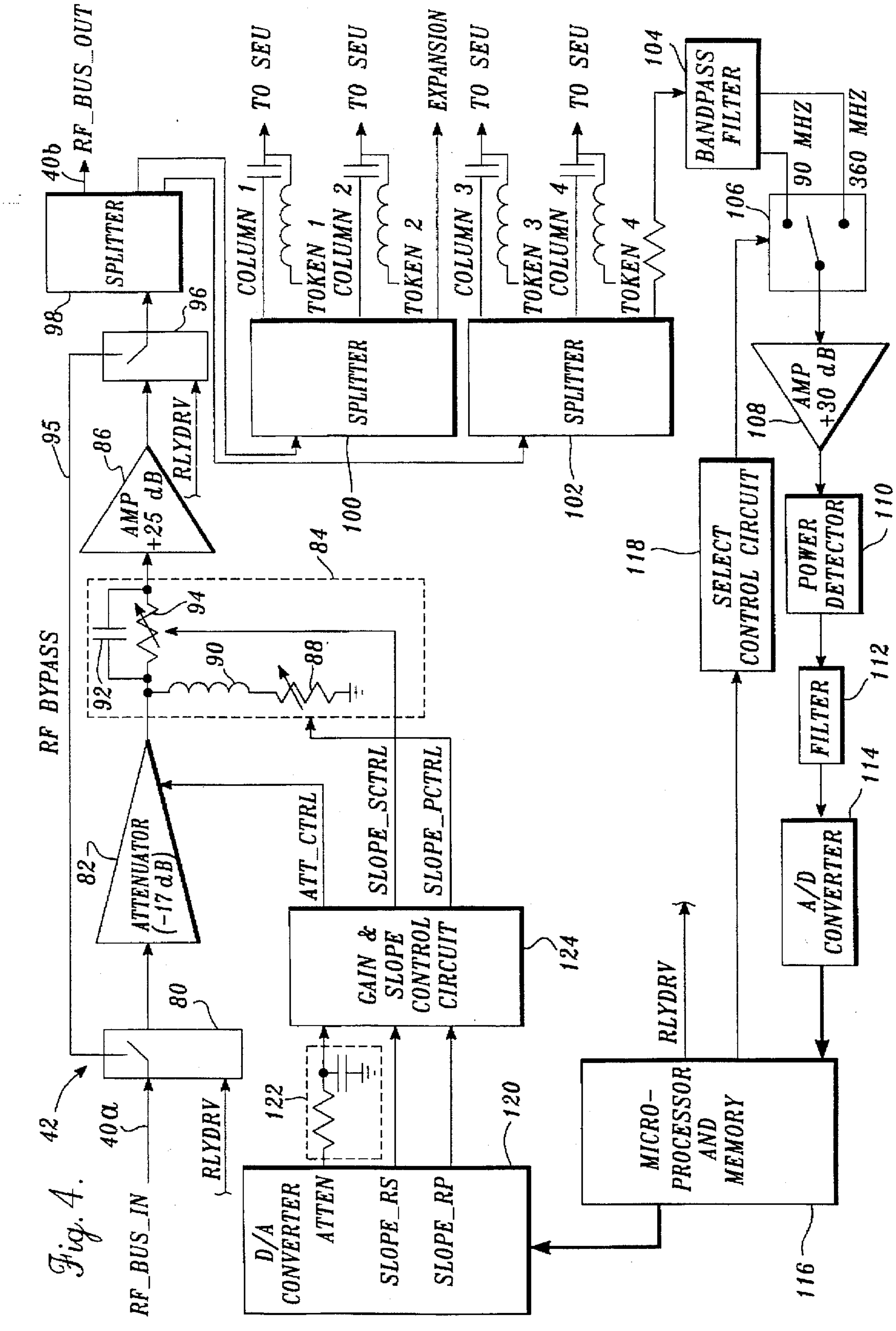
FIG. 4 is a block diagram of a zone management unit (ZMU) suitable for use in the passenger entertainment distribution system of FIG. 1.
Figure 5A:
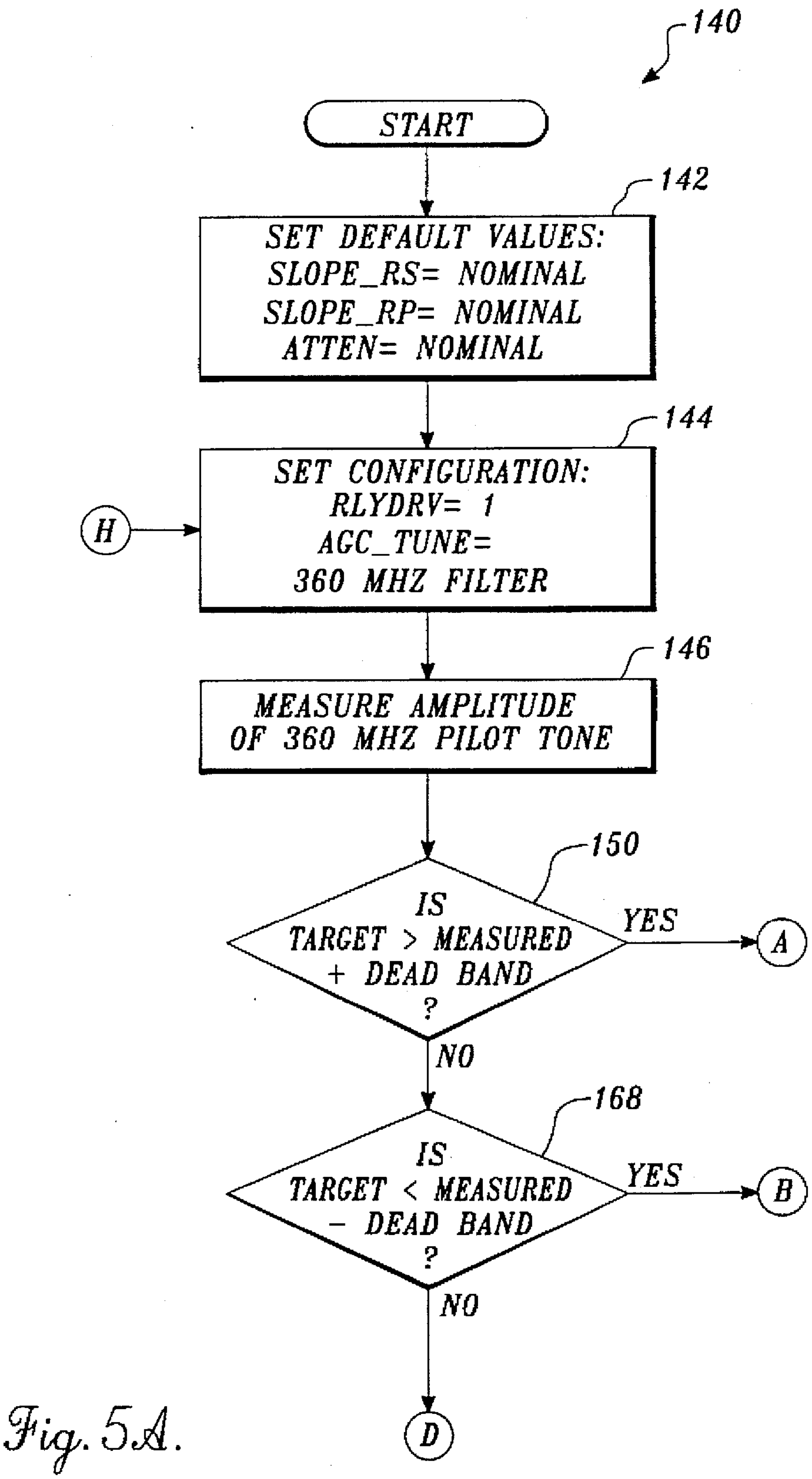
FIGS. 5A through 5F are flow charts of an initialization program for configuring the ZMU to amplify and condition an entertainment signal carried on a bus.
Figure 5B:
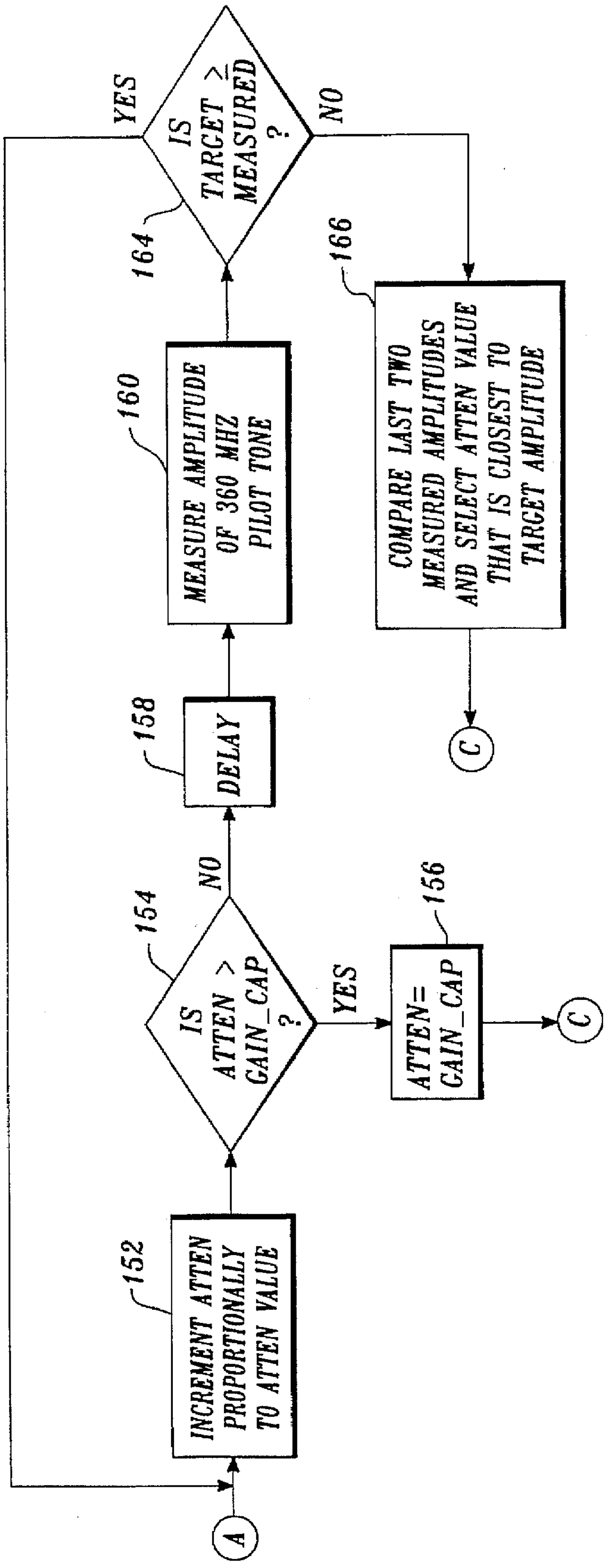
Figure 5C:
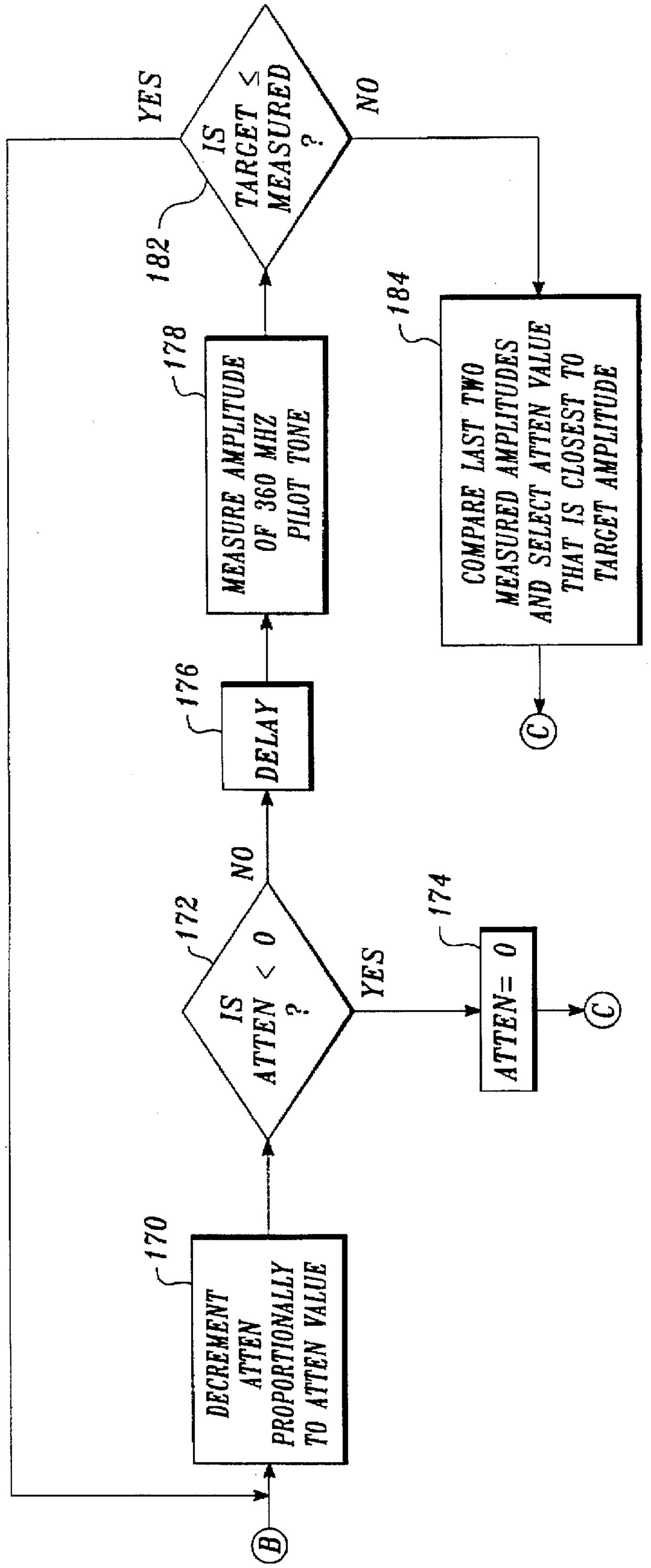
Figure 5D:
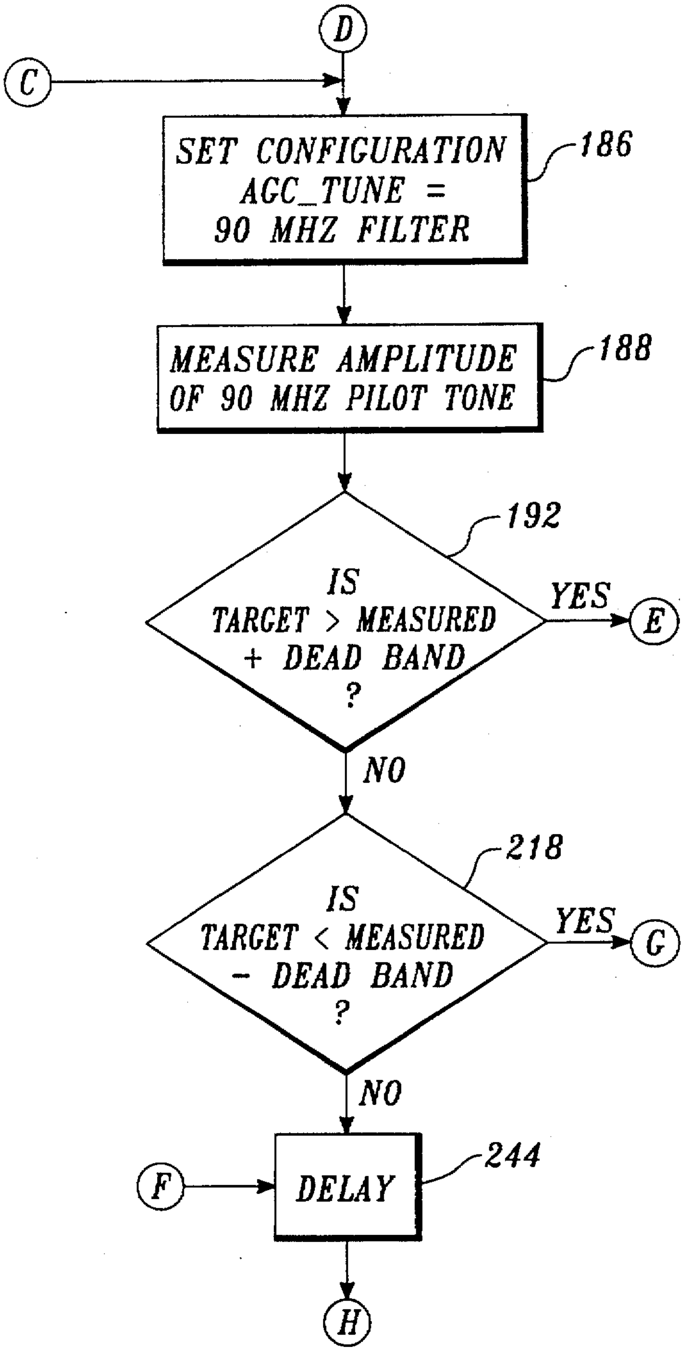
Figure 5E:
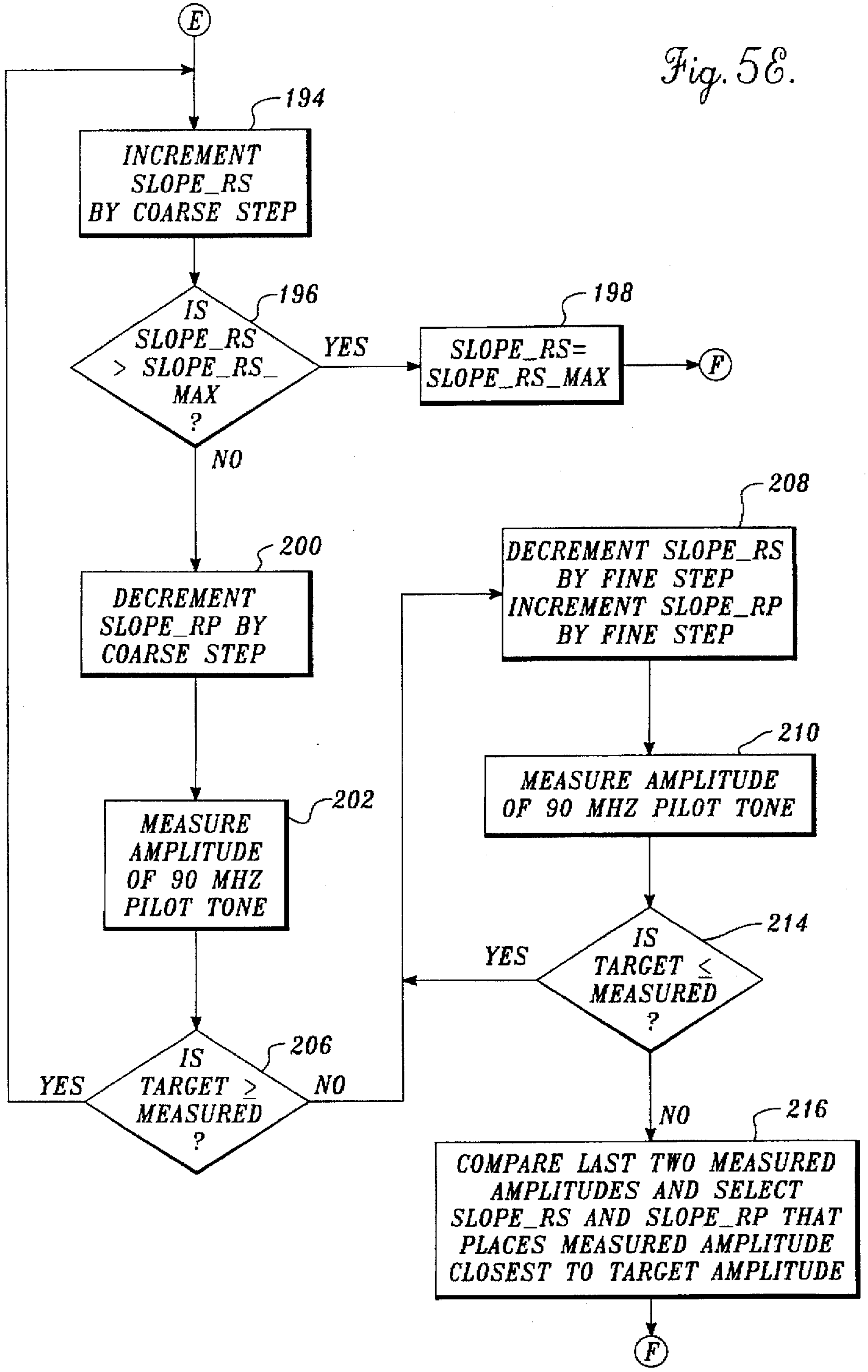
Figure 5F:
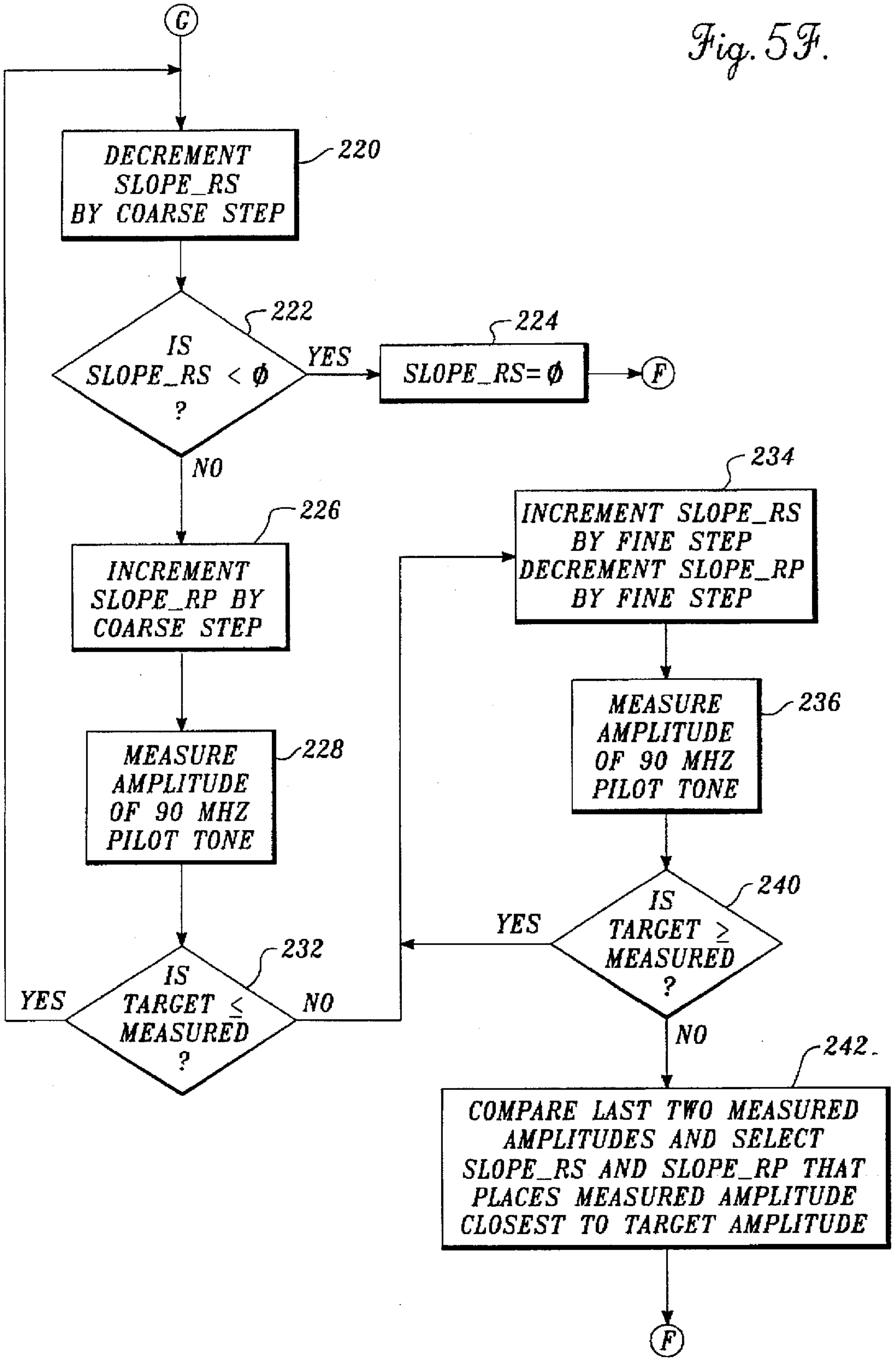

FIG. 4 is a block diagram of the signal amplification and conditioning hardware contained within each ZMU 42*a*, 42*b*, . . . 42*n*. It will be appreciated that the ZMU hardware can be envisioned as having two paths: an upper path that conditions and amplifies the entertainment signal, and a lower path that controls the amount of conditioning and amplification provided by the upper path. Starting with the upper path, the entertainment signal is received on the bus 40*a* and passes initially through a relay 80. In normal operation, the relay 80 is energized to connect the entertainment signal to attenuator 82. In a preferred embodiment, the attenuator 82 is a variable attenuator that can reduce the amplitude of the entertainment signal between 0 and −17 dB. The amount of attenuation provided by the attenuator 82 is determined by an ATTEN control signal described in further detail below.

After being attenuated, the entertainment signal passes through a frequency slope compensation network 84. Two filters are provided within the slope compensation network 84. A first filter consists of an inductor 90 and a variable resistance p-i-n diode 88 connected in series between the RF bus and ground. The first filter acts as a high pass filter to shunt low frequencies to ground. The cutoff frequency of the first filter is dependent upon the resistance of the p-i-n diode 88, which is controlled by the value of a SLOPE_RP control signal produced by a control circuit discussed below. The second filter in the slope compensation network 84 is constructed of a capacitor 92 in parallel with a p-i-n diode 94. The second filter is connected in series with the RF bus and acts as a high pass filter to block low frequencies carried on the bus. The cutoff frequency of the high pass filter is dependent upon the resistance of the p-i-n diode 94, which is determined by the value of a SLOPE_RS control signal produced by the control circuit.

After passing through the slope compensation network, the entertainment signal is input into an amplifier 86. In a preferred embodiment of the distribution system, the amplifier 86 provides a fixed +25 dB of gain to the signal, boosting the overall entertainment signal level. The passenger entertainment signal then passes through a relay 96, which is normally energized to allow the entertainment signal to reach three signal splitters 98, 100, and 102.

The splitters 98, 100, and 102 divide the entertainment signal for distribution to the remainder of the passenger entertainment system. Splitter 98 divides the entertainment signal into three copies. One copy of the entertainment signal is output on the bus **40*b*, which distributes the entertainment signal to the other ZMUs in the chain of ZMUs. The remaining two copies of the entertainment signal are provided to splitter 100 and splitter 102. Splitters 100 and 102 each distribute the entertainment signal to two columns of SEUs. With reference to FIG. 1, each ZMU is capable of supplying a copy of the passenger entertainment signal to four daisy chains of SEUs. Splitter 100 connects to two of these chains, identified as column 1 and column 2 in FIG. 4. Splitter 102 connects to the other two chains, identified as column 3 and column 4. The remaining line from splitter 100 is available for future system expansion. The remaining copy of the passenger entertainment signal generated by splitter 102** is provided to the control circuitry contained within the ZMU.

The control circuitry in the ZMU is represented by the lower path of FIG. 4. The control circuitry provides feedback to adjust the attenuation of the attenuator 82 and the slope compensation provided by the slope compensation network 84. Initially, the passenger entertainment signal is provided by splitter 102 to a filter 104. Filter 104 contains two band pass filters, each centered at the frequency of the pilot tones carried in the entertainment signal. In a preferred embodiment of the invention, one of the band pass filters is therefore centered at 90 MHz, and the second band pass filter is centered at 360 MHz. Filter 104 has two outputs that are connected to a filter select switch 106. The filter select switch 106 has an input which allows a microprocessor 116 within the control circuit to select which pilot tone is conducted through the switch. Microprocessor 116 outputs a signal to a select control circuit 118 which will selectively set the filter select switch 106 to pass the desired pilot tone. Switching the pilot tones allows a desired pilot tone to be sampled and analyzed, but prevents both pilot tones from being examined simultaneously.

The output from the filter select switch 106 is connected to an amplifier 108. In a preferred embodiment, the amplifier 108 provides a constant +30 dB gain to the signal. The output from the amplifier 108 is connected to a power detector 110. The power detector 110 generates a direct current (DC) voltage level proportional to the rms amplitude of the sinusoidal pilot tone. Those skilled in the art will recognize that several different circuits can be used to generate a DC signal level that is proportional to the amplitude of the AC pilot tone.

The output from the power detector 110 is input into a filter 112. Filter 112 is a low pass filter which filters and removes any high frequency noise that is contained on the DC voltage level representing the amplitude of the pilot tone being examined. The filter 112 removes the AC component of the signal and provides an accurate averaging of the pilot tone signal over a period of time. The output from the filter 112 is connected to an analog-to-digital converter 114, which samples the DC level representative of the amplitude of the pilot tone and converts it into a digital value that is provided to the microprocessor 116. In a preferred embodiment of the invention, the A-to-D converter 114 provides 10 bits of resolution over the input DC signal range. It will be appreciated that by selectively switching the filter select switch 106, the microprocessor 116 can therefore receive a digital value representative of the amplitude of the 90 MHz pilot tone or the 360 MHz pilot tone. Since the pilot tones bracket the entertainment signal channels containing the audio and video information, the microprocessor 116 can therefore estimate the overall attenuation of the entertainment signal. The attenuation may be caused by transmission of the entertainment signal on the RF bus 40 from the EMC to the ZMU, or by transmission from ZMUs nearer the EMC in the daisy chain of ZMUs.

To compensate for the attenuation caused by the RF bus 40, the microprocessor 116 produces three control signals to control the entertainment signal amplification and conditioning provided in the upper path of the ZMU. The microprocessor 116 is connected to a digital-to-analog (D-to-A) converter 120. Digital control signals sent by the microprocessor to the D-to-A converter 120 are converted into three analog control signals. To control the overall amplification provided by the ZMU, the microprocessor generates an ATTEN control signal. The ATTEN signal is filtered by a filter 122 and passes through a gain and slope control circuit 124 before reaching the attenuator 82. Filter 122 removes high frequency components from the ATTEN control signal in order to avoid rapid changes in the attenuation provided by the attenuator. By adjusting the level of the signal ATTEN, the microprocessor can vary the attenuation provided by the attenuator 82, and therefore the overall amplification provided to the entertainment signal.

To control the amount of signal conditioning provided by the ZMU, the microprocessor generates a SLOPE_RS control signal and a SLOPE_RP control signal. The control signals vary the resistance of the p-i-n diodes contained within the slope compensation network 84, adjusting the compensation provided by the network. The SLOPE_RS control signal is used to vary the resistance of the p-i-n diode 94, changing the cutoff frequency of the signals that are blocked by the p-i-n diode and the capacitor 92. The SLOPE_RP control signal is used to adjust the resistance of the p-i-n diode 88, changing the cutoff frequency of the signals that are shunted by the p-i-n diode and the inductor 90. By altering the levels of the three control signals, the microprocessor 116 can therefore adjust the amplitude and the slope compensation that is provided to the entertainment signal by the ZMU.

FIGS. 5A–5F present a flow chart of an initialization program 140 performed by the microprocessor 116 to initialize the ZMU and determine the appropriate amplitude and conditioning for the entertainment signal. The program operation will be discussed with reference to the hardware configuration shown in FIG. 4. At a block 142, the program initially sets default values for the three control signals that are controlled by the microprocessor. The SLOPE_RS, SLOPE_RP, and ATTEN variables are each set to nominal values that are used as a baseline. (It will be appreciated that the SLOPE_RS, SLOPE_RP, and ATTEN variables in the initialization program description directly set the level of the SLOPE_RS, SLOPE_RP, and ATTEN control signals applied to the attenuator 82 and the frequency slope compensation network 84.) At a block 144, the program configures the hardware of the ZMU. The normally-open relays 80 and 96 are energized so that the entertainment signal passes through the attenuator 82 and the slope compensation network 84 rather than being conducted on the bypass line 95. The filter select switch 106 is also set so that the 360 MHz pilot tone is initially sampled.

At a block 146 the program measures the amplitude of the 360 MHz pilot tone carried on the entertainment signal. At a decision block 150, the program compares the measured amplitude of the pilot tone plus a dead band value with a target amplitude of the pilot tone. The target amplitude of the pilot tone is stored in a non-volatile memory (not shown) and is selected based on the signal requirements for the audio and video receivers at each passenger seat. The dead band is a constant that defines an acceptable operating range of the measured pilot tone around the target amplitude of the pilot tone. In a preferred embodiment of the invention the dead band is defined to be ±2 dB around the target pilot tone amplitude. Thus, at decision block 150, a branch is taken if the target amplitude is greater than the measured amplitude of the pilot tone plus the dead band value.

If the target pilot tone amplitude is greater than the measured pilot tone amplitude plus the dead band, the program branches to a block 152. Since the target is greater than the measured amplitude, the attenuation of the ZMU must be decreased. The attenuator 82 attenuates the entertainment signal inversely to the value of the ATTEN signal. Therefore, a higher ATTEN value results in less attenuation, and a lower ATTEN value results in greater attenuation. To decrease the attenuation provided by the attenuator 82, the ATTEN variable must therefore increase. At a block 152, the variable ATTEN is incremented proportionally to the current value of ATTEN. If the ATTEN value is currently low, ATTEN is incremented by a large step. If ATTEN is currently high, then the variable is incremented with a smaller step. At a decision block 154, the program checks to see if the ATTEN variable has exceeded a maximum allowable value, corresponding to the minimum attenuation. If it has, the program branches to a block 156. At block 156 the ATTEN variable is set at the maximum value. If the ATTEN variable has not exceeded the maximum value, then the program continues to a block 158. At block 158, the program delays for a short period of time to allow the entertainment signal to stabilize at a new amplitude. At a block 160, the program then repeats the measurement of the amplitude of the 360 MHz pilot tone. At a decision block 164, the program compares the pilot tone amplitude with the target amplitude to see if the target amplitude of the pilot tone is greater than or equal to the measured level of the pilot tone. In contrast to the main routine, the branch consisting of blocks 152–164 does not use a dead band to determine an appropriate entertainment signal amplitude. Instead, the branch attempts to set the target pilot tone amplitude and the measured pilot tone amplitude as closely as possible. At decision block 164, if the target amplitude is still greater than the measured amplitude, the program returns to a block 152 to increment the ATTEN variable. If, however, the target is less than the measured amplitude, the program proceeds to a block 166. At block 166 the program compares the last two measured signal amplitudes and selects the ATTEN value that produces a pilot tone amplitude that is closest to the target amplitude. That is, of the last two measured pilot tone amplitudes, one of the measured pilot tone amplitudes will be greater than the target amplitude, and the other measured pilot tone amplitude will be less than the target amplitude. At block 166 the program examines the measured amplitude that is greater than the target amplitude and the one that is less than the target amplitude to select the ATTEN value that produces a pilot tone amplitude that is closest in absolute value to the target amplitude. Following blocks 156 or 166, the program continues at a block 186.

Following decision block 150, if the target amplitude is not greater than the measured amplitude plus the dead band, the program proceeds to a decision block 168. At block 168, the program determines if the target amplitude is less than the measured amplitude minus the dead band. If the target is less than the measured amplitude minus the dead band the program branches to a block 170. Since the target is less than the measured amplitude, the attenuation of the entertainment signal provided by the ZMU must be increased. At block 170, the ATTEN variable is therefore decremented using steps proportional to the current ATTEN value. Blocks 172–184 mirror those in blocks 154–166 except that the ATTEN variable is decremented, rather than incremented. The program determines whether the ATTEN variable has been reduced past a minimum value at blocks 172–174, and sets the variable equal to zero if it has. If ATTEN does not drop to below zero, then at blocks 178–182 the program remeasures the 360 MHz pilot tone to find the ATTEN value at which the measured amplitude is closest to the target pilot amplitude. The program determines this by decrementing the ATTEN value until the measured amplitude passes from a level below the target amplitude to a level greater than the target amplitude. At a block 184, the program compares the last two measured pilot tone amplitudes to identify the value of ATTEN that places the measured pilot tone amplitude closest to the target amplitude. Following blocks 174 or 184, the program continues at a block 186.

When the program reaches block 186, the amplification provided by the ZMU to the entertainment signal has been set so that the amplitude of the 360 MHz pilot tone falls within a predefined dead band surrounding the target amplitude for the 360 MHz pilot tone. That is, the value of the variable ATTEN has been determined that will provide the proper attenuation of the entertainment signal by the ZMU. Following setting of the ATTEN variable, the ZMU must determine the appropriate value of the SLOPE_RS and SLOPE_RP variables. To begin this process, at a block 186 the program configures the hardware in the ZMU by setting the filter select switch 106 to allow the microprocessor to sample the signal level of the 90 MHz pilot tone.

At a block 188, the program measures the amplitude of the 90 MHz pilot tone contained within the entertainment signal. At a decision block 192, the program compares the measured amplitude of the pilot tone plus a dead band value with a target amplitude. As before, the program is designed to ensure that the measured pilot tone amplitude operates within a certain dead band around the target pilot tone amplitude. In a preferred embodiment of the invention, the dead band is defined to be ±2 dB around the target amplitude.

If the target amplitude is greater than the measured amplitude plus a dead band, the program branches to a block 194. The branch represented by blocks 194 through 216 reduce the low frequency rejection of the slope compensation network 84. Initially the program enters a coarse adjustment stage. At block 194, the SLOPE_RS variable is incremented by a coarse step. Incrementing by a coarse step allows the SLOPE_RS variable to quickly approach the desired value with a minimum number of iterations of the branch. At a block 196, the SLOPE_RS variable is compared with a maximum value for the variable. If the SLOPE_RS variable has exceeded the maximum value, at a block 198 the SLOPE_RS value is set to the maximum value. If the SLOPE_RS value has not exceeded the maximum value, at a block 200 the SLOPE_RP control signal is decremented by a coarse step. Incrementing the SLOPE_RS variable and decrementing the SLOPE_RP variable decreases the low frequency rejection of the slope compensation network 84 by varying the resistance of the p-i-n diodes in the network.

At a block 202, the program measures the amplitude of the 90 MHz pilot tone. At a decision block 206, the program compares the measured pilot tone amplitude with the target pilot tone amplitude. If the target amplitude is greater than or equal to the measured amplitude, the program loops back to a block 194 where the two variables governing the rejection of the slope compensation network are again changed by a coarse step and the measured amplitude recompared with the target amplitude. By changing the variables by coarse steps, the program in blocks 194 to 206 quickly approaches the desired slope compensation network setting.

If, however, the measured pilot tone amplitude is greater than the target pilot tone amplitude, the program enters a fine adjustment stage. At a block 208 the SLOPE_RS variable is decremented by a fine step, and the SLOPE_RP variable is incremented by a fine step. At blocks 210 and 214 the amplitude of the 90 MHz pilot tone is measured and compared with the target amplitude. If the target amplitude is less than or equal to the measured pilot tone amplitude, the program returns to block 208 where the SLOPE_RS and SLOPE_RP variables are again changed by a fine step. If, however, the target amplitude is less than or equal to the measured amplitude, the program continues to a block 216. At block 216 the program determines which of the last two measured amplitudes was closest to the target amplitude. The closest measured pilot tone amplitude is determined, and the SLOPE_RS and SLOPE_RP values selected which correspond to the closest measured value. After proceeding through block 198 or block 216, the program continues to a block 234.

Returning to block 192, if the target amplitude of the pilot tone is not greater than the measured amplitude of the pilot tone plus the dead band, the program proceeds to a decision block 218. At decision block 218, the program checks to see if the target amplitude of the pilot tone is less than the measured amplitude of the pilot tone minus the dead band. If the target amplitude is less than the measured amplitude minus the dead band the program proceeds to a branch defined by blocks 220–242. Those skilled in the art will recognize that blocks, 220–242 parallel the branch described by blocks 194–216. Instead of incrementing the SLOPE_RS and decrementing the SLOPE_RP variables, however, the SLOPE_RS variable is decremented and the SLOPE_RP variable is incremented in the blocks 220–242 branch. This increases the rejection of the slope compensation network, lowering the amplitude of the 90 MHz pilot tone. As before, the appropriate values for the slope compensation network variables are rapidly determined by incrementing the variables during a coarse equalization stage before entering a fine equalization stage.

If the program proceeds through decision block 192 and decision block 218 without satisfying either of the conditions defined in the blocks, the amplitude of the 90 MHz pilot tone places the pilot tone within the dead band around the target amplitude. When operating within this range, appropriate equalization is provided by the ZMU to the entertainment signal to compensate for the unequal frequency attenuation of the signal during transmission. The program then proceeds to a block 244, where the program delays for a period of time. During the delay period the microprocessor may be used for other functions within the ZMU. The length of the delay depends upon the expected fluctuation in the entertainment signal level. If frequent signal level changes are expected, the settings of the variables controlling the attenuator and slope compensation network may be reset fairly often. If the passenger entertainment signal is fairly stable, the recalibration may be performed rather infrequently. In a preferred embodiment of the system, a recalibration is performed approximately every 200 to 500 msec. It will be appreciated that after the initialization routine has been performed by the ZMU, the channels contained within the entertainment signal are maintained within a desired and known amplitude range. That is, by appropriately setting the amplitude of both the 90 MHz pilot tone and the 360 MHz pilot tone, the audio and video channels carried in the bandwidth between these pilot tones are accurately amplified and suitable for distribution to the remainder of the passenger entertainment system.

After the delay at block 244, the program returns to block 144 to recalibrate the attenuator and slope compensation network. As will be discussed below, during normal operation the ZMU maintains appropriate amplification and conditioning of the entertainment signal for distribution to the remainder of the passenger entertainment system. If the amplitude of the entertainment signal received on the RF bus 40*a* fluctuates, the ZMU corrects for any loss in amplitude within an operating range limited largely by the construction of the attenuator 82 and the frequency slope compensation network 84.

3. SEU Hardware and Initialization

Returning to FIG. 3, after the ZMUs have been initialized at block 64, each of the seat electronics units (SEUs) 48*a*, 48*b*, . . . 48*n* are initialized, starting with the SEU 48*a* closest to the ZMU, and proceeding sequentially until the last SEU 48*n* in each daisy chain. At a block 66, each SEU is initially assigned an address indicative of its position in the daisy chain. At a block 68, each SEU is initialized. The SEU hardware and initialization can be better appreciated with reference to FIGS. 6, 7, 8A and 8B.

Figure 6:
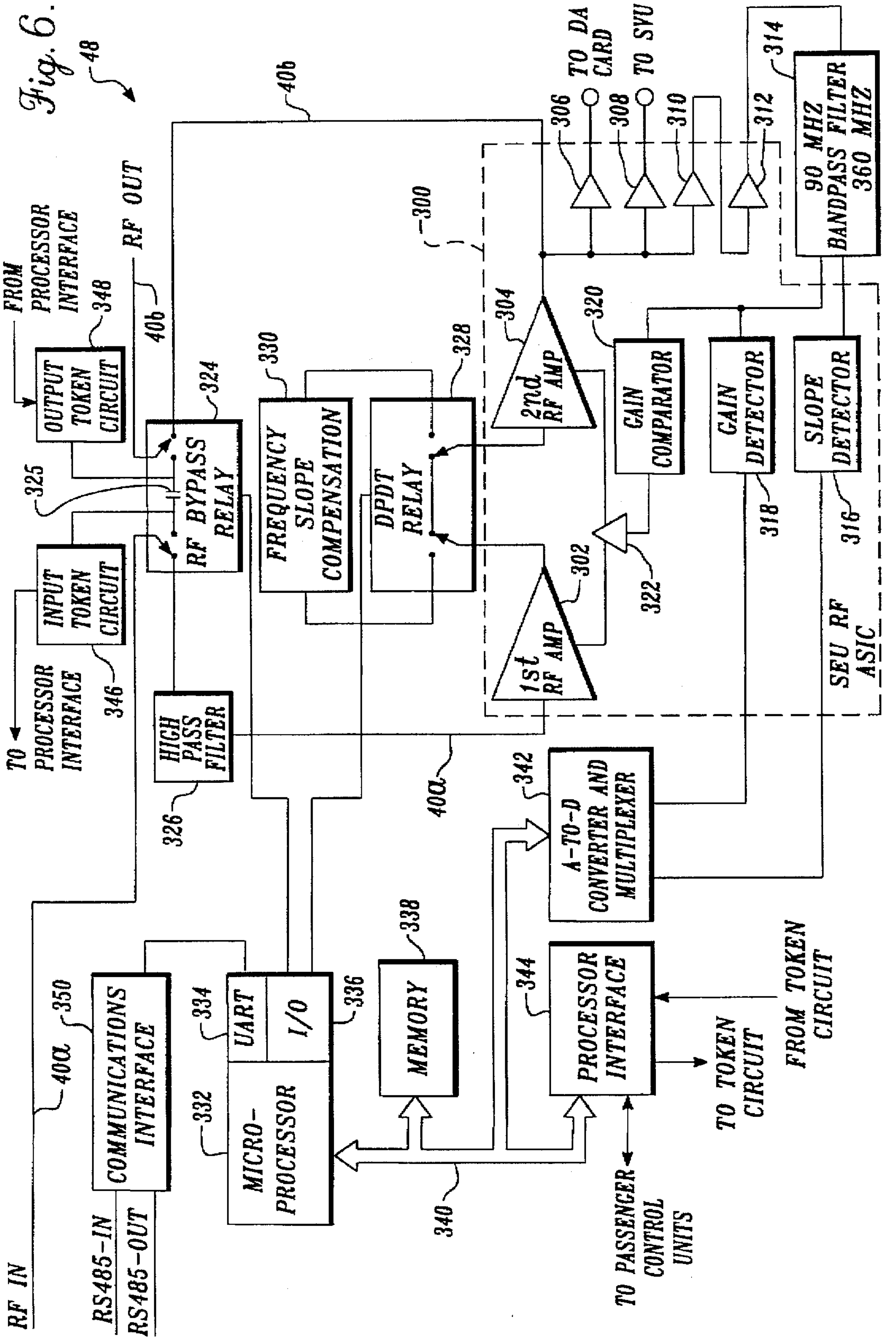
FIG. 6 is a block diagram of a seat electronics unit (SEU) suitable for use in the passenger entertainment distribution system of FIG. 1.

FIG. 6 is a block diagram of the hardware in the SEU 48. The central component of the SEU is an Application Specific Integrated Circuit (ASIC) 300 that has been custom designed to automatically maintain the amplitude of a signal carried on an RF bus. The design of ASIC 300 is disclosed in co-pending U.S. application Ser. No. 08/403,408, filed Mar. 14, 1995 and entitled "Radio Frequency Bus Leveling System" (herein incorporated by reference). While a brief description of the operation of the ASIC will be described herein, those seeking further details for the operation of the chip are referred to the co-pending application.

In brief, the ASIC 300 contains two variable gain radio frequency (RF) amplifiers 302 and 304 that are connected in series with the RF bus. Each amplifier amplifies the entertainment signal carried on the bus under the automatic and continuous control of an on-chip control circuit. Connected to the output of the amplifier 304 are three buffers 306, 308, and 310. Buffers 306 and 308 tap the entertainment signal from the RF bus 40 and provide the signal to the passenger seat audio and video receivers (not shown). Buffer 310 forms the initial stage of the control circuit used to monitor and adjust the amplification of the amplifiers 302 and 304. The entertainment signal is tapped from the bus 40*b* by the buffer 310 and passed through a preamplifier 312 before being input into a bandpass filter 314. The bandpass filter 314 filters the 90 MHz and 360 MHz pilot tones from the entertainment signal. The 360 MHz pilot tone is input into a slope detector 316 which generates a DC voltage proportional to the rms amplitude of the pilot tone. The 90 MHz pilot tone is input into a gain comparator 320 and a gain detector 318. The gain detector 318 produces a DC voltage proportional to the rms amplitude of the 90 MHz pilot tone. The gain comparator 320 compares the rms amplitude of the 90 MHz pilot tone with a voltage reference indicative of a desired amplitude. The gain comparator produces a control signal to change the amplification provided by the amplifiers 302 and 304 when the amplitude of the pilot tone is not equivalent to the voltage reference. The control signal generated by the gain comparator 320 is amplified by a driver 322, which provides sufficient current to adjust the resistance of two p-i-n diodes contained within the RF amplifiers 302 and 304. If the pilot tone amplitude is too low, the control signal increases the amplification provided by the amplifiers by increasing the resistance of the p-i-n diodes in the amplifiers. If the pilot tone amplitude is too high, the amplification provided by the amplifiers 302 and 304 is reduced. In this manner, the ASIC 300 automatically and continuously maintains a desired amplitude of the entertainment signal carried on the RF bus.

In addition to maintaining the amplitude of the entertainment signal, the SEU contains circuitry to measure the entertainment signal and provide appropriate compensation to correct for unequal frequency attenuation of the signal caused during transmission. The DC voltage levels produced by the gain detector 318 and the slope detector 316, and indicative of the amplitude of the 90 MHz and 360 MHz pilot tones, are coupled from the ASIC 300 to an A-to-D converter and multiplexer 342. The A-to-D converter digitizes the amplitude of the pilot tones, and provides the values to a microprocessor 332 via a bus 340. During an initialization procedure that will be described in further detail below, the microprocessor 332 compares the amplitude of the 360 MHz pilot tone with a desired amplitude level that is stored in non-volatile memory 338. Based on the amplitude of the measured pilot tone, the microprocessor determines whether a frequency slope compensation network 330 should be switched in series with the RF bus. The microprocessor controls whether the frequency slope compensation network is connected between the RF amplifier 302 and RF amplifier 304 of the ASIC 300 by selectively energizing or de-energizing a double-pole double-throw (DPDT) relay 328. Switching the frequency slope compensation network 330 in series with the RF bus will hereinafter be referred to as switching the frequency slope compensation network "on." Removing the frequency slope compensation network from between the amplifiers 302 and 304 by deenergizing the relay 328 will hereinafter be referred to as switching the frequency slope compensation network "off."

Figure 7:
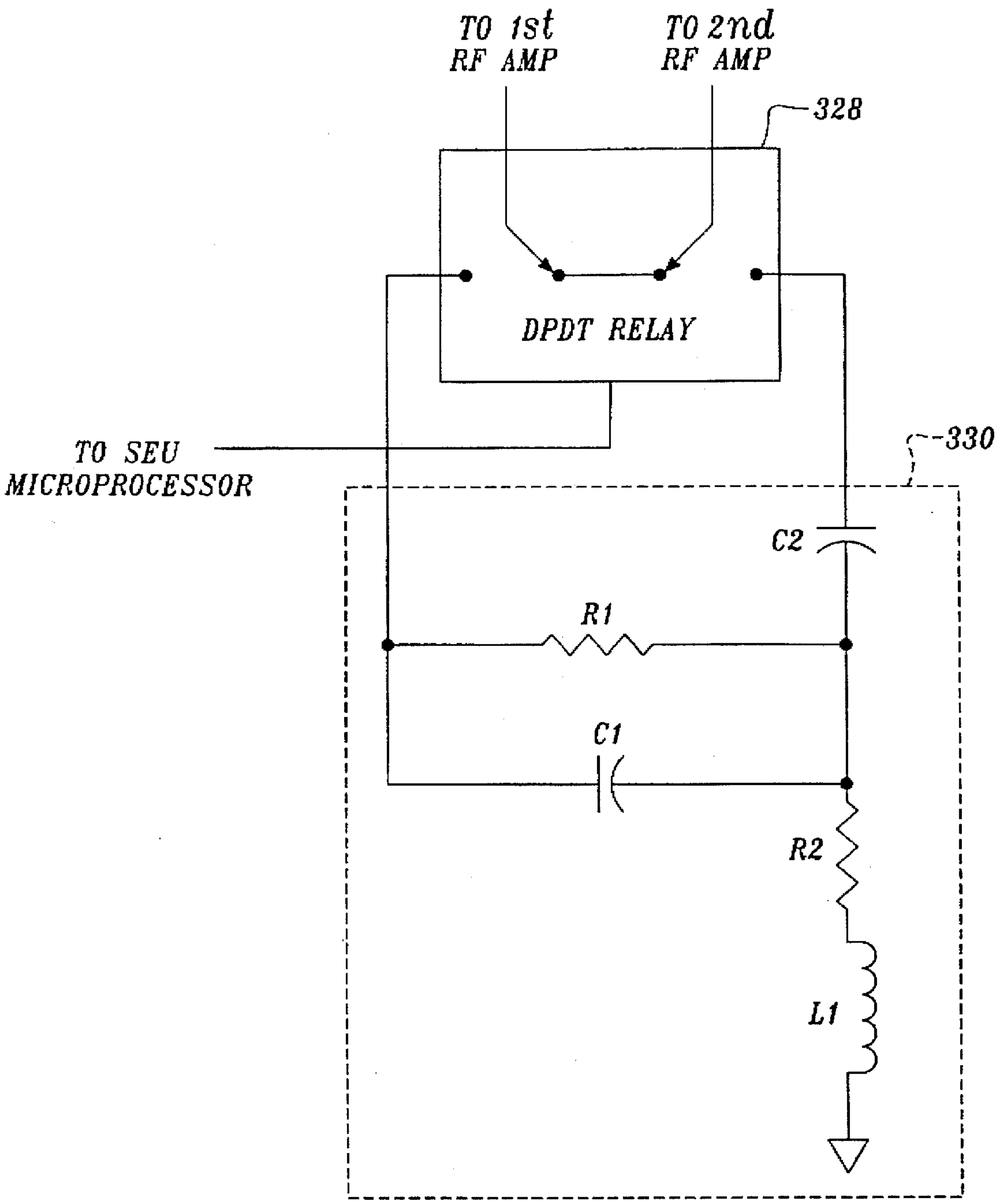
FIG. 7 is a circuit diagram of a representative frequency slope compensation network found within the SEU of FIG. 6.

A representative schematic of the frequency slope compensation network 330 is shown in FIG. 7. As shown in FIG. 7, in a preferred embodiment of the SEU, the frequency slope compensation network is a passive network consisting of resistors, capacitors, and inductors. Connected across two terminals of the DPDT relay 328 are a parallel combination of a resistor R1 and a capacitor C1 in series with a capacitor C2. At the point where the parallel combination of R1 and C1 are tied to capacitor C2, a series combination of a resistor R2 and an inductor L1 is connected to ground. The frequency slope compensation network is designed to attenuate the low frequencies of the entertainment signal more than the high frequencies. When the frequency slope compensation network is switched on, the low frequencies of the entertainment signal (including the 90 MHz pilot tone) are attenuated. As the 90 MHz pilot tone is attenuated, the amplification provided by the ASIC 300 automatically increases. Switching the frequency slope compensation network on therefore provides appropriate slope compensation to correct the unequal frequency attenuation of the entertainment signal, without reducing the overall amplitude of the entertainment signal.

Returning to FIG. 6, the microprocessor 332 is also connected to other components of the passenger entertainment system to allow communication during initialization and operation. The microprocessor can communicate with the ZMU through a Universal Asynchronous Receiver/Transmitter (UART) 334 and a communications interface 350. In a preferred embodiment, the communications interface 350 is coupled with the associated ZMU via a twisted wire pair. Serial data may be transmitted and received between the microprocessor and the ZMW based on the RS-485 standard. The microprocessor can also communicate with passenger control units (not shown) located at each passenger seat through a processor interface 344 connected to the microprocessor by the bus 340.

The flow of the entertainment signal through the SEU may take one of two paths. The entertainment signal is received at the SEU on the RF bus 40*a* where it initially passes through a bypass relay 324. The bypass relay can be selectively energized by the microprocessor to connect or disconnect the ASIC 300 with the RF bus 40. In a first path, corresponding to periods when the SEU is being initialized or when there is a failure condition in the SEU, the microprocessor does not energize the relay, and the input of the RF bus 40*a* is directly connected with the output of the RF bus 40*b*. The entertainment signal is therefore directly conducted to the next SEU in the daisy chain of SEUs, bypassing the ASIC 300.

In a second path corresponding to normal operation of the SEU, the bypass relay is energized by the microprocessor 332. This routes the entertainment signal through a high pass filter 326. The high pass filter 326 eliminates noise on the entertainment signal by filtering out frequencies below 90 MHz. The entertainment signal is then routed through the first RF amplifier 302, the DPDT relay 328, and the second RF amplifier 304. As discussed above, the amplitude of the entertainment signal is automatically maintained by the ASIC 300. Depending on the state of the relay 328, the entertainment signal may also be routed through the frequency slope compensation network 330 to appropriately condition the signal. After amplification and conditioning, the entertainment signal passes through the bypass relay 324, and is output on the RF bus 40*b*. The determination of whether to provide equalization to the entertainment signal is made during an initialization routine discussed below.

Recall from FIG. 1 that each SEU is daisy-chained in a string extending from each ZMU. Prior to initialization of the SEUs, each SEU in the daisy chain must be assigned an address indicative of its location in the daisy chain. An address indicative of the placement of the SEU in the daisy chain is necessary because the SEUs must be initialized sequentially in order to properly set the level of the entertainment signal.

When the system is initially powered on, the RF bypass relay 324 contained in the SEU is normally de-energized so that the input of the RF bus 40*a* is directly connected to the output of the RF bus 40*b*. This ensures that if a particular SEU in the daisy chain fails to power up, that the entertainment signal is still provided to SEUs further along the daisy chain. To assign an address to each SEU, the microprocessor in the ZMU generates a token signal on the RF bus 40. With reference to FIG. 4, the token signal is applied to each daisy chain of SEUs on lines respectively identified as TOKEN 1, TOKEN 2, TOKEN 3, and TOKEN 4. In a preferred embodiment, the token signal is a transition from a low direct current (DC) voltage to a high DC voltage. Returning to FIG. 6, the DC token signal transition is effectively blocked by a capacitor 325 contained in the RF bypass relay 324, ensuring that the first SEU in the daisy chain will be the first SEU to detect the token signal. The token signal is received through an input token circuit 346 and into the processor interface 344 before being detected by the microprocessor 332. The input token circuit 346 is a low pass filter to ensure that noise from the processor interface will not be coupled onto the RF bus. When the microprocessor 332 detects the token signal, the microprocessor establishes communication over the RS-485 twisted wire pair with the ZMU microprocessor, and receives a distinct address identifying its location in the daisy chain. Once the microprocessor 332 in the first SEU on the daisy chain has received its address, it generates a token signal through the processor interface and an output token circuit 348. The token signal is applied on the RF output bus 40*b*, and conducted to the second SEU unit in the daisy chain, where it is blocked by the capacitor 325 within the second unit's RF bypass relay 324. The second SEU thus detects the token signal, and receives from the ZMU a distinct address identifying its location in the daisy chain. In this manner, each SEU in the daisy chain sequentially receives a distinct address from the ZMU as the token signal is passed from SEU to SEU.

Figure 8A:
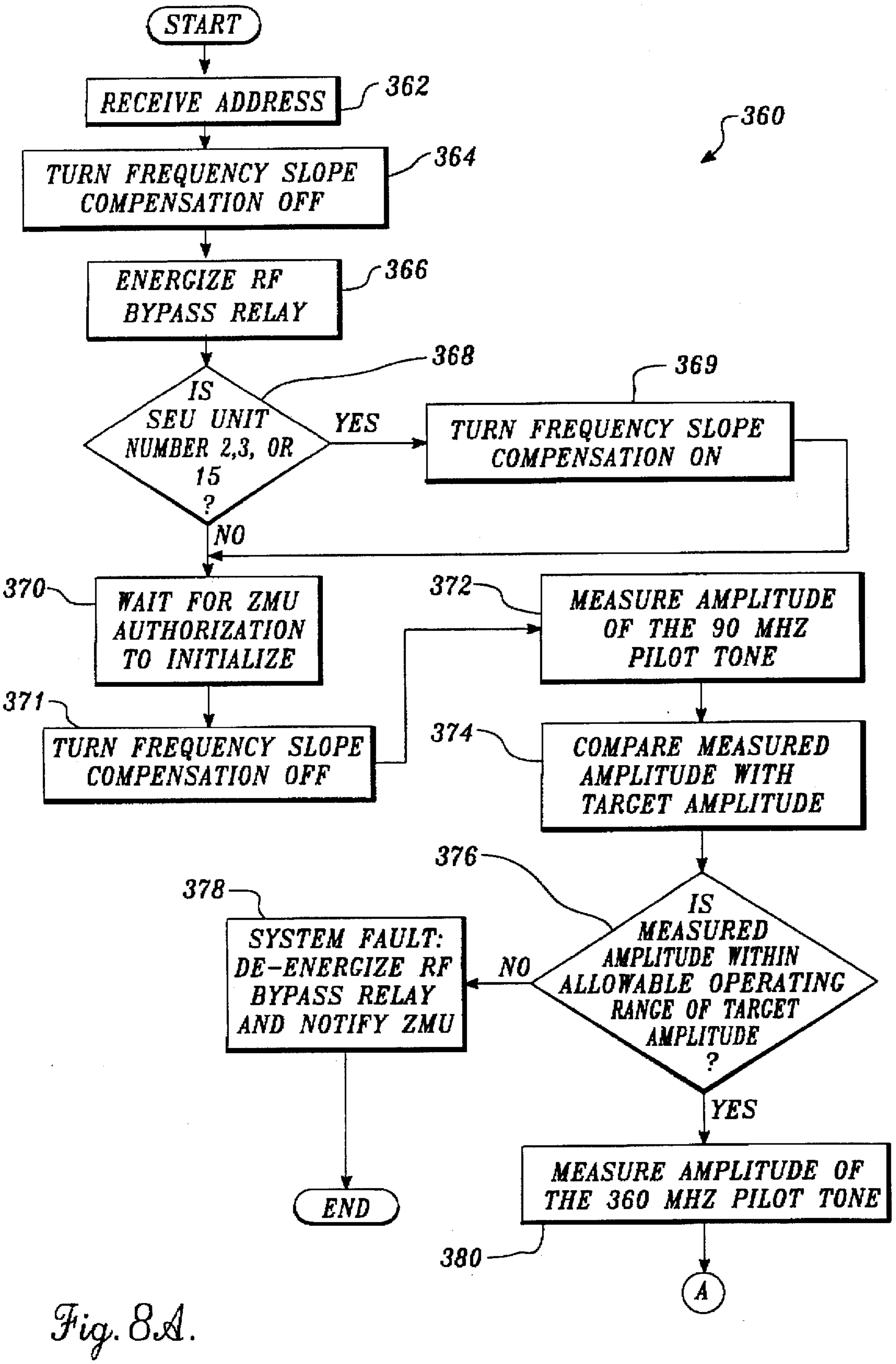
FIGS. 8A and 8B are flow charts of an initialization program for configuring the SEU to condition an entertainment signal carried on a bus.
Figure 8B:
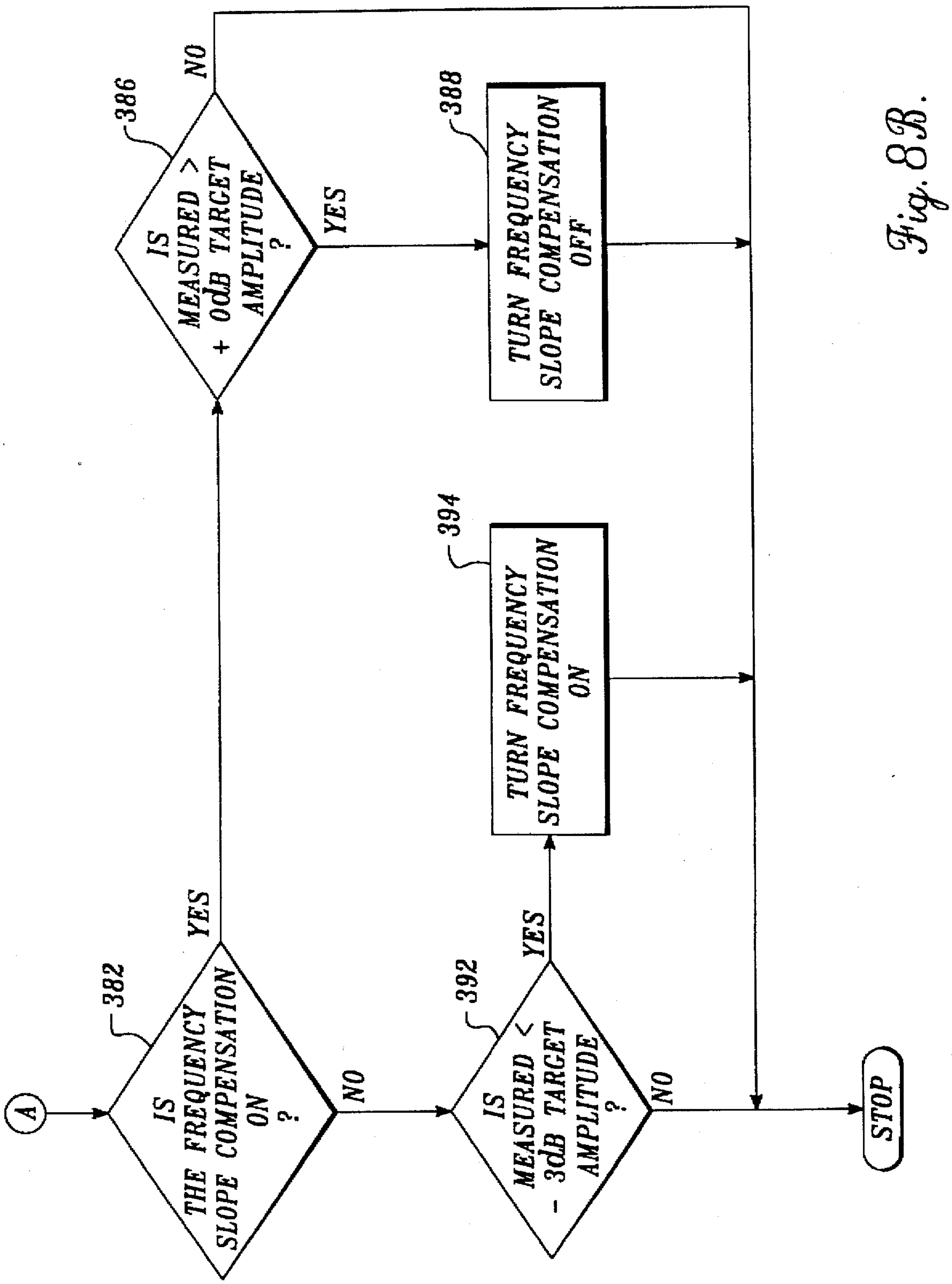

Once each SEU has received an address on the daisy chain bus, the SEUs may be initialized. FIGS. 8A and 8B are flow charts of an initialization program 360 that may be used to determine whether the frequency slope compensation network should be switched into series with the RF bus for each SEU in the daisy chain. The initialization routine will be discussed with respect to the first SEU in the daisy chain of SEUs. It will be appreciated, however, that each SEU in the chain will be sequentially initialized under the command of the ZMU. At a block 362, the SEU receives the daisy chain address in the manner discussed above. The initialization program then proceeds to a block 364, where the frequency slope compensation network 330 is turned off by de-energizing the DPDT relay 328. Block 364 ensures that the relay 328 is correctly reset prior to initialization of the SEU. At a block 366, the microprocessor energizes the RF bypass relay 324. This connects the ASIC 300 in series with the RF bus 40, configuring the SEU for normal operation.

At a decision block 368, the initialization program determines whether the address of the SEU has been assigned position number 2, 3, or 15 within the daisy chain as numbered sequentially from the ZMU. In a preferred embodiment of the invention it has been determined that for a daisy chain having thirty-one SEUs, SEU numbers 2, 3, and 15 should have their frequency slope compensation network switched in series with the RF bus. Switching the frequency slope compensation networks on for these respective SEUs ensures that if a number of SEUs fail to correctly initialize, sufficient slope compensation is still provided to the entertainment signal so that the SEUs at the end of the daisy chain receive an adequate signal level. At a block 369, if the SEU address indicates a position of 2, 3, or 15, the microprocessor therefore switches the frequency slope compensation network 330 on by energizing the DPDT relay 328. It will be appreciated that for daisy chains of different lengths, it may be experimentally determined that differently addressed SEUs should have their frequency slope compensation network switched in series with the RF bus.

At a block 370 the SEU waits to receive an initialization command from the associated ZMU. Each SEU is initialized sequentially, starting with the first SEU in the daisy chain and proceeding to the last SEU in the daisy chain. Upon receipt of the initialization command, the frequency slope compensation network is turned off at a block 371. Block 371 ensures that the relay 328 is correctly reset prior to testing the entertainment signal level.

At a block 372, the program measures the amplitude of the 90 MHz pilot tone. The microprocessor measures the amplitude by sampling the DC signal generated by the gain detector 318. At a block 374, the measured amplitude of the 90 MHz pilot tone is compared with a target amplitude that is stored in the non-volatile memory 338. At a decision block 376, the program determines if the measured amplitude of the pilot tone is within an acceptable operating range around the target amplitude. If the measured amplitude is outside the acceptable operating range surrounding the target amplitude, the program branches to a block 378 where the microprocessor de-energizes the RF bypass relay 324, connecting the RF input bus 40*a* directly to the RF output bus 40*b*. The program also notifies the ZMU of the fault, that is, the failure of the ASIC 300 to provide appropriate amplification to the entertainment signal in the SEU.

If, however, the measured amplitude of the 90 MHz pilot tone falls within the acceptable operating range, the program continues to a block 380 where the program measures the amplitude of the 360 MHz pilot tone. The amplitude of the 360 MHz pilot tone is determined by sampling the DC output voltage generated by the slope detector 316. At a block 382, the program determines whether the frequency slope compensation circuit 330 is connected with the ASIC 300 by checking the state of the DPDT relay 328. If the frequency slope compensation is on, the program branches to a decision block 386 where it compares the measured power level of the 360 MHz pilot tone with a +0 dB target level. That is, at block 386 the program checks to see if the measured amplitude of the 360 MHz pilot tone is greater than a signal having an amplitude that is +0 dB over the target amplitude level. If the measured amplitude is greater than the +0 dB target amplitude, at a block 388 the microprocessor turns the frequency slope compensation network off by de-energizing the DPDT relay 328. After blocks 386 or 388, the initialization of the SEU is complete and the program halts.

Returning to decision block 382, if the frequency slope compensation network is initially off, the program continues to a block 392. At block 392, the program compares the amplitude of the 360 MHz pilot tone with a −3 dB target amplitude. The −3 dB target amplitude is equivalent to a signal having an amplitude that is 3 dB less than the target amplitude of the pilot tone. If the measured amplitude is less than the −3 dB target amplitude, the program proceeds to a block 394 where the frequency slope compensation is turned on by energizing the DPDT relay 328. If, however, the measured pilot tone amplitude is greater than the −3 dB target level, the initialization of the SEU is complete and the program halts.

After initialization of each SEU in the SEU daisy chain, it will be appreciated that the SEUs maintain the entertainment signal channels within a desired and known amplitude range along the length of the daisy chain. By appropriately setting the amplitude of both the 90 MHz and 360 MHz pilot tones, the audio and video channels carried in the bandwidth between these pilot tones are accurately amplified and suitable for distribution to the audio and video receivers at each passenger seat. If the amplitude of the entertainment signal on the RF bus 40*a* were to fluctuate, each SEU corrects for any loss in amplitude within an operating range limited in part by the construction of the ASIC 300 and the frequency slope compensation network 330.

II. Distribution System Operation

Returning to FIG. 3, after the ZMU and the SEU have been initialized, the passenger aircraft entertainment distribution system enters an operating mode at block 70. As discussed above, initialization only occurs when a change has been made to the distribution network. If no change has been made to the network, the system may bypass the initialization procedure described by blocks 62 through 68 and proceed directly to the operating mode.

During the operating mode, the ZMUs 42*a*, 42*b*, . . . 42*n* continuously monitor and adjust the amplification provided to the entertainment signal and the frequency slope compensation provided across the bandwidth of the entertainment signal. In addition to describing the initialization of the ZMU, the program described in the flow charts of FIGS. 5A through 5F is performed by each ZMN to monitor and adjust the amplification and signal conditioning provided to the entertainment signal during normal operation. In a preferred embodiment of the invention, the amount of signal amplification and conditioning is recalibrated approximately every 200 to 500 msec.

Similarly, during the operating mode the SEUs 48*a*, 48*b*, . . . 48*n* monitor and continuously adjust the amplification of the entertainment signal to provide an appropriate signal level to each passenger seat. The automatic monitoring and adjustment of the amplification is described in the co-pending application entitled "Radio Frequency Bus Leveling System." The frequency slope conditioning provided by each of the SEUs remains fixed during normal operation. Whether each frequency slope compensation network is turned on or off for a particular SEU is determined during the initialization procedure described in the flow charts of FIGS. 8A and 8B.

In the manner described above, the passenger entertainment distribution system of the present invention allows an entertainment signal to be distributed over a network regardless of any changes to the network. To accommodate different aircraft seating configurations, the length of cables in the network may be varied, and SEUs may be added or removed to each SEU daisy chain. When a new network is created in an aircraft, the distribution system of the present invention may be reinitialized to configure the network to provide appropriate amplification and signal conditioning of the entertainment signal.

It will be appreciated that the distribution system construction described herein has several advantages over those distribution systems shown in the prior art. Most importantly, the use of in-line amplifiers limits transmission reflections on the daisy chain of SEUs, keeping amplitude ripple on the bus to a minimum. The isolation provided by each in-line amplifier therefore allows a greater number of SEUs to be connected to the daisy chain. In a preferred embodiment of the distribution system, at least thirty-one SEUs may be daisy-chained together without causing undue amplitude ripple on the common bus. Additionally, by providing amplification and conditioning before the signal is tapped at each SEU, the overall signal power level may be kept at a relatively low level. In a preferred embodiment of the distribution system, the signal power of each RF carrier is maintained at less than $2\times10^{-6}$ watts. The lower signal power level minimizes the probability of interference with other aircraft electronic systems.

It will also be appreciated that faults within the distribution system disclosed herein may be easily identified. Each SEU contains a bypass relay that may be selectively switched to connect the input bus of the SEU directly to the output bus of the SEU if there is a failure in the SEU. The bypass relay ensures that if a SEU fails, no load is placed upon the common bus to potentially degrade the entertainment signal to those SEUs that are located farther down the daisy chain. The failure of one SEU in the system will therefore not affect the remaining SEUs in the daisy chain. It is also easy to identify and correct any failures in the distribution network by identifying the particular nonoperational passenger entertainment audio receivers and video displays.

It will further be appreciated that the active tap construction disclosed herein also allows the distribution network to be easily expanded to service additional passenger seats. Additional ZMUs or SEUs may be added to the daisy chain to increase the distribution network size. The number of SEUs that may be daisy chained together is limited in part by the amount of distortion and noise that is introduced by each amplifier in the daisy chain. In a preferred embodiment of the system, at least thirty-one SEUs may be daisy-chained together without significant loss in entertainment signal quality delivered to the SEUs at the end of the daisy chain.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An audio and video distribution system for distributing an entertainment signal over a bus from an entertainment signal source to a plurality of audio and video receivers, the entertainment signal containing a first and a second pilot tone, the distribution system comprising:

(a) a bus coupled to the entertainment signal source and carrying the entertainment signal; and (b) a plurality of seat electronic units (SEUs) coupled to the bus, each of the plurality of SEUs comprising:

(i) a variable gain amplifier connected in series with the bus, the variable gain amplifier having a control input such that a control signal provided to the control input will vary the gain produced by the variable gain amplifier;

(ii) a control circuit coupled to the bus and to the control input of the variable gain amplifier, the control circuit monitoring an amplitude of the first pilot tone of the entertainment signal carried on the bus and generating and applying a control signal to the control input in order to adjust the gain of the variable gain amplifier to maintain the amplitude of the entertainment signal at the desired level;

(iii) a tap coupled to the bus and providing the entertainment signal carried on the bus to one of the plurality of audio and video receivers, and (iv) a bypass relay connected in series with the bus, wherein in an energized state, the bypass relay connects the variable gain amplifier, control circuit, and tap to the bus, and in an unenergized state, the bypass relay disconnects the variable gain amplifier, control circuit, and tap from the bus.

2. The distribution system of claim 1, wherein each of the plurality of SEUs further comprises:

(a) a slope compensation network; and (b) a two-position switch coupled to the slope compensation network, wherein in a first position the switch connects the slope compensation network in series with the bus and in a second position the switch disconnects the slope compensation network from the bus.

3. The distribution system of claim 2, wherein each of the plurality of SEUs further comprises a computer coupled to the output of the variable gain amplifier and to the switch, the computer monitoring amplitude of the second pilot tone and switching the slope compensation network into series with the bus if the amplitude of the second pilot tone is not equal to a desired level.

4. The distribution system of claim 3, wherein the slope compensation network is a high pass filter.

5. The distribution system of claim 3, wherein each of the plurality of SEUs further comprises a buffer connected between the tap and one of the plurality of audio and video receivers.

6. The distribution system of claim 5, wherein each of the plurality of SEUs further comprises a second buffer connected between the tap and a second one of the plurality of audio and video receivers.

7. The distribution system of claim 1, further comprising a zone management unit (ZMU) connected to the bus between the entertainment signal source and the plurality of SEUs, the zone management unit comprising:

(a) a variable gain amplifier connected in series with the bus, the variable gain amplifier having a control input such that a control signal provided to the control input will vary the gain produced by the variable gain amplifier;

(b) a control circuit coupled to the bus and to the control input of the variable gain amplifier, the control circuit monitoring an amplitude of the second pilot tone of the entertainment signal carried on the bus and generating and applying a control signal to the control input in order to adjust the gain of the variable gain amplifier to maintain the amplitude of the entertainment signal at a desired level; and (c) a splitter connected in series with the bus and splitting the entertainment signal carried on the bus into a plurality of entertainment signals, one of the plurality of entertainment signals being provided on the bus coupled to the plurality of SEUs.

8. The distribution system of claim 7, wherein the variable gain amplifier contained in the ZMU comprises a variable attenuator connected in series with a fixed gain amplifier, the variable attenuator varying the attenuation of the entertainment signal carried on the bus in response to the control signal.

9. The distribution system of claim 7, wherein the ZMU further comprises a slope compensation network connected to the bus.

10. The distribution system of claim 9, wherein the slope compensation network contained in the ZMIU comprises:

(a) an inductor having a first lead connected to the bus; and (b) a p-i-n diode having a first lead connected to ground and a second lead connected to a second lead of the inductor, the p-i-n diode having a control lead connected to the control circuit of the ZMU, wherein the control circuit monitors an amplitude of the first pilot tone of the entertainment signal and generates and applies a first slope control signal to the control lead of the p-i-n diode, thereby varying the resistance of the p-i-n diode and the frequency compensation provided by the slope compensation network in order to maintain a desired amount of frequency compensation.

11. The distribution system of claim 10, wherein the slope compensation network contained in the ZMU further comprises:

(a) a capacitor connected in series with the bus; and (b) a second p-i-n diode connected in parallel with the capacitor, the second p-i-n diode having a control lead connected to the control circuit of the ZMU, wherein the control circuit monitors an amplitude of the first pilot tone of the entertainment signal and generates and applies a second slope control signal to the control lead of the second p-i-n diode, thereby varying the resistance of the second p-i-n diode and the frequency compensation provided by the slope compensation network in order to maintain a desired amount of frequency compensation.

12. The distribution system of claim 7, wherein the entertainment signal is split from the bus after it has been amplified by the variable gain amplifier in the ZMU.

13. The distribution system of claim 7, wherein the ZMU further comprises a bypass relay connected in series with the bus, wherein in an energized state, the bypass relay connects the variable gain amplifier and slope compensation network to the bus, and in an unenergized state, the bypass relay disconnects the variable gain amplifier and slope compensation network from the bus.

14. The distribution system of claim 7, further comprising a second bus connected to the splitter of the ZMU and having a plurality of SEUs coupled to the bus, wherein the second bus carries one of the plurality of entertainment signals produced by the splitter.

15. An audio and video distribution system for distributing an entertainment signal having a first pilot tone and a second pilot tone over a bus to a plurality of audio and video receivers, the system comprising:

(a) a bus for carrying an entertainment signal; and (b) a plurality of seat electronic units (SEUs), each of the plurality of SEUs comprising:

(i) a slope compensation network;

(ii) a means for switching the slope compensation network in series with the bus;

(iii) a variable gain amplifier connected in series with the bus, the variable gain amplifier having a control input wherein a control signal provided to the control input will vary the gain produced by the variable gain amplifier;

(iv) a control circuit coupled to the bus, to the means for switching the slope compensation circuit in series with the bus, and to the control input of the variable gain amplifier, the control circuit monitoring an amplitude of the first and second pilot tones in the entertainment signal carried on the bus and switching the slope compensation network in series with the bus if the amplitude of the first and second pilot tones fall below a desired level in order to maintain a desired equalization of the entertainment signal, the control circuit further monitoring the first pilot tone and generating and applying a control signal to the control input in order to adjust the gain of the variable gain amplifier to maintain the amplitude of the entertainment signal at a desired level;

(v) a tap coupled to the bus to allow the entertainment signal from the bus to be provided to an audio or video receiver; and (vi) a bypass relay connected in series with the bus, wherein in an energized state, the bypass relay connects the means for switching the slope compensation network, variable gain amplifier, control circuit, and tap to the bus, and in an unenergized state, the bypass relay disconnects the means for switching the slope compensation network, variable gain amplifier, control circuit, and tap from the bus.

16. The distribution system of claim 15, wherein the slope compensation network is a high pass filter.

17. The distribution system of claim 15, wherein each of the plurality of SEUs further comprises a buffer connected between the tap and an audio and video receiver.

18. The distribution system of claim 16, wherein each of the plurality of SEUs further comprises a second buffer connected between the tap and a second audio and video receiver.

19. An audio and video distribution system for distributing and entertainment signal having a first pilot tone and a second pilot tone over a bus to a plurality of audio and video receivers, the system comprising:

(a) a bus for carrying an entertainment signal; and (b) a plurality of zone management units (ZMUs), each of the plurality of ZMUs comprising:

(i) a slope compensation network connected in series with the bus, the slope compensation network having a slope control input wherein a slope control signal provided to the slope control input will vary the filtering provided by the slope compensation network;

(ii) a variable gain amplifier connected in series with the bus, the variable gain amplifier having a gain control input wherein a gain control signal provided to the gain control input will vary the gain produced by the variable gain amplifier;

(iii) a control circuit coupled to the bus, to the slope control input of the slope compensation network, and to the gain control input of the variable gain amplifier, the control circuit monitoring an amplitude of the first and second pilot tones in the entertainment signal carried on the bus and generating and applying a slope control signal to maintain a desired equalization of the entertainment signal, the control circuit further monitoring the first pilot tone and generating and applying a gain control signal to the gain control input in order to adjust the gain of the variable gain amplifier to maintain the amplitude of the entertainment signal at the desired level;

(iv) a tap coupled to the bus to allow the entertainment signal from the bus to be provided to an audio or video receiver; and (v) a bypass relay connected in series with the bus, wherein in an energized state, the bypass relay connects the slope compensation network, variable gain amplifier, control circuit, and tap to the bus, and in an unenergized state, the bypass relay disconnects the slope compensation network, variable gain amplifier, control circuit, and tap from the bus.

20. The distribution system of claim 19, wherein the slope compensation network is a high pass filter.

* * * * *

UNITED STATES PATENT AND TRADEMARK OFFICE

CERTIFICATE OF CORRECTION

PATENT NO. : 5,745,159
DATED : April 28, 1998
INVENTOR(S) : D.W. Wax et al.

It is certified that error appears in the above-identified patent and that said Letters Patent is hereby corrected as shown below:

| COLUMN | LINE | |
|---|---|---|
| [56] | Refs. Cited | Insert the following references:<br>--3,594,645 7/1971 Hallmark<br>4,061,970 12/1977 Magneron<br>4,896,209 1/1990 Matsuzaki et al.<br>4,934,983 6/1990 Miyo<br>5,058,198 10/1991 Rocci et al.<br>5,220,419 6/1993 Sklar et al.-- |
| 20<br>(Claim 1, | 40<br>line 25) | "receivers," should read --receivers;-- |
| 20<br>(Claim 3, | 58<br>line 4) | after "monitoring" insert --an-- |
| 21<br>(Claim 10, | 36<br>line 2) | "ZMIU" should read --ZMU-- |

Signed and Sealed this

First Day of September, 1998

Attest:

BRUCE LEHMAN

*Attesting Officer* *Commissioner of Patents and Trademarks*